US010899262B2

(12) United States Patent
Wheeler

(10) Patent No.: US 10,899,262 B2
(45) Date of Patent: Jan. 26, 2021

(54) BLADDER SUPPORT SYSTEM FOR A VEHICLE SEAT ASSEMBLY

(71) Applicant: KA Group AG, Zurich (CH)

(72) Inventor: Douglas J. Wheeler, Farmington Hills, MI (US)

(73) Assignee: KA Group AG, Zürich (CH)

(*) Notice: Subject to any disclaimer, the term of this patent is extended or adjusted under 35 U.S.C. 154(b) by 0 days.

(21) Appl. No.: 16/265,479

(22) Filed: Feb. 1, 2019

(65) Prior Publication Data

US 2020/0247296 A1 Aug. 6, 2020

(51) Int. Cl.
*B60N 2/66* (2006.01)
*B60N 2/90* (2018.01)
*B60N 2/02* (2006.01)

(52) U.S. Cl.
CPC ......... *B60N 2/914* (2018.02); *B60N 2/0244* (2013.01); *B60N 2/665* (2015.04); *B60N 2/99* (2018.02)

(58) Field of Classification Search
CPC ...... B60N 2/7082; B60N 2/7088; B60N 2/66; B60N 2/665; B60N 2/666; B60N 2/914; A47C 7/467
USPC .......................................... 297/284.6, DIG. 3
See application file for complete search history.

(56) References Cited

U.S. PATENT DOCUMENTS

| | | | | |
|---|---|---|---|---|
| 4,467,426 A * | 8/1984 | Hida | ...................... | A47C 7/467 |
| | | | | 701/49 |
| 4,592,588 A * | 6/1986 | Isono | ...................... | A47C 7/467 |
| | | | | 297/284.6 |
| 4,707,027 A * | 11/1987 | Horvath | ................. | B60N 2/914 |
| | | | | 297/284.6 |
| 4,915,124 A * | 4/1990 | Sember, III | ............ | A47C 7/467 |
| | | | | 137/223 |
| 5,005,904 A * | 4/1991 | Clemens | ................ | A47C 7/467 |
| | | | | 141/114 |

(Continued)

FOREIGN PATENT DOCUMENTS

DE 102014001678 B3 7/2014
DE 102015217044 A1 3/2017

OTHER PUBLICATIONS

English language abstract for DE102014001678 B3 extracted from espacenet.com database on Jul. 10, 2019, 1 page.

(Continued)

*Primary Examiner* — Kyle J. Walraed-Sullivan
(74) *Attorney, Agent, or Firm* — Howard & Howard Attorneys PLLC

(57) ABSTRACT

One example of a vehicle seat assembly includes a seat back, a seat bottom coupled to the seat back, and a bladder support system coupled to at least one of the seat back and the seat bottom. The bladder support system includes air cells and a pump fluidly connected to the air cells to selectively inflate the air cells when the pump receives an activation signal. A valve system defining flow paths fluidly connected between the pump and the air cells. The valve system includes at least three control valves, with each control valve generating a control valve output when receiving the activation signal. The valve system also includes passive valves movable to an open position to inflate the corresponding air cell when receiving at least three control valve outputs. A controller is configured to send the activation signal to the control valves and the pump.

25 Claims, 29 Drawing Sheets

(56) References Cited

U.S. PATENT DOCUMENTS

| | | | | |
|---|---|---|---|---|
| 5,022,385 A * | 6/1991 | Harza | | A61H 1/0292 601/149 |
| 5,090,076 A * | 2/1992 | Guldager | | A47C 27/082 137/223 |
| 5,127,708 A * | 7/1992 | Kishi | | A61B 5/18 297/284.1 |
| 5,129,704 A * | 7/1992 | Kishi | | B60N 2/0224 297/284.1 |
| 5,155,685 A * | 10/1992 | Kishi | | B60N 2/914 701/49 |
| 5,263,765 A * | 11/1993 | Nagashima | | A47C 7/467 297/284.6 |
| 5,320,409 A * | 6/1994 | Katoh | | B60N 2/0232 297/284.6 |
| 5,570,716 A * | 11/1996 | Kamen | | F16K 31/006 137/223 |
| 5,707,109 A * | 1/1998 | Massara | | B60N 2/914 297/284.9 |
| 6,055,473 A * | 4/2000 | Zwolinski | | B60N 2/002 701/49 |
| 6,098,000 A * | 8/2000 | Long | | A47C 4/54 701/49 |
| 6,203,105 B1 * | 3/2001 | Rhodes, Jr. | | A47C 4/54 297/284.6 |
| 6,273,810 B1 * | 8/2001 | Rhodes, Jr. | | A47C 4/54 454/120 |
| 6,422,087 B1 * | 7/2002 | Potter | | B60N 2/0232 73/731 |
| 10,253,893 B2 * | 4/2019 | Yin | | F16K 11/22 |
| 2003/0038517 A1 * | 2/2003 | Moran | | B60N 2/914 297/284.3 |
| 2003/0230917 A1 * | 12/2003 | Dorfler | | B60N 2/914 297/284.1 |
| 2010/0031449 A1 * | 2/2010 | Cheng | | A61H 9/0078 5/713 |
| 2010/0181813 A1 * | 7/2010 | Kramer | | B60N 2/0244 297/217.3 |
| 2010/0289302 A1 * | 11/2010 | Cheng | | B60N 2/002 297/180.12 |
| 2011/0227388 A1 * | 9/2011 | Bocsanyi | | B60N 2/4415 297/452.41 |
| 2011/0229359 A1 * | 9/2011 | Dorfler | | F04B 45/043 417/480 |
| 2012/0143108 A1 * | 6/2012 | Bocsanyi | | B60N 2/976 601/148 |
| 2014/0230921 A1 * | 8/2014 | Bocsanyi | | F04B 43/021 137/223 |
| 2014/0232155 A1 * | 8/2014 | Bocsanyi | | A47C 4/54 297/284.6 |
| 2014/0318667 A1 * | 10/2014 | Ebel | | F17C 5/06 141/4 |
| 2016/0185263 A1 * | 6/2016 | Uno | | B60N 2/665 297/284.1 |
| 2016/0304009 A1 * | 10/2016 | Ogiso | | B60N 2/62 |
| 2017/0274801 A1 * | 9/2017 | Shibata | | B60N 2/02 |
| 2017/0368968 A1 * | 12/2017 | Shibata | | B60N 2/914 |
| 2017/0368969 A1 * | 12/2017 | Shibata | | B60N 2/914 |
| 2018/0104135 A1 | 4/2018 | Lem et al. | | |
| 2018/0147964 A1 * | 5/2018 | Ogiso | | A61H 9/0078 |

OTHER PUBLICATIONS

Computer-generated English language abstract for DE102015217044 A1 extracted from espacenet.com database on Jul. 10, 2019, 3 pages.

* cited by examiner

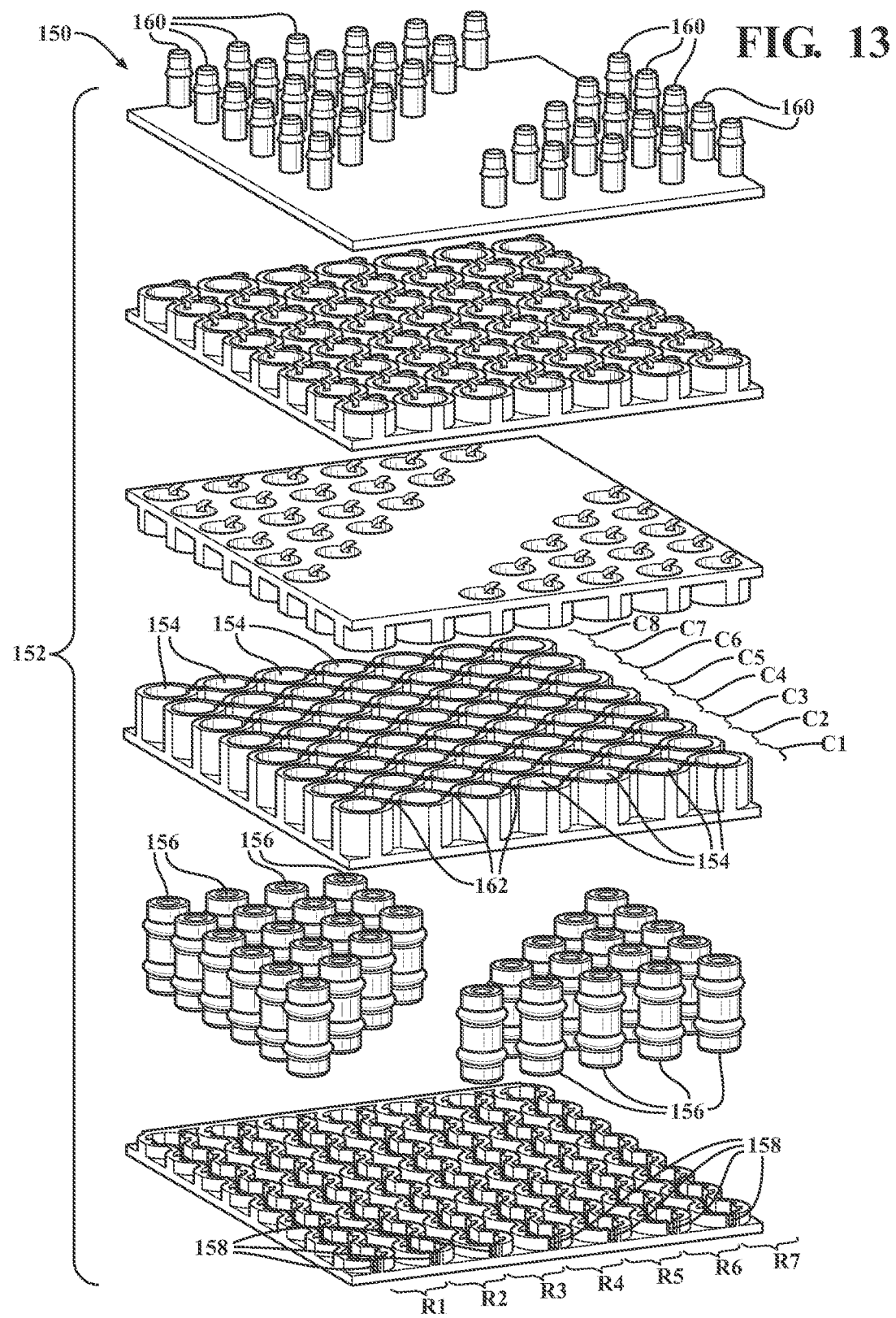

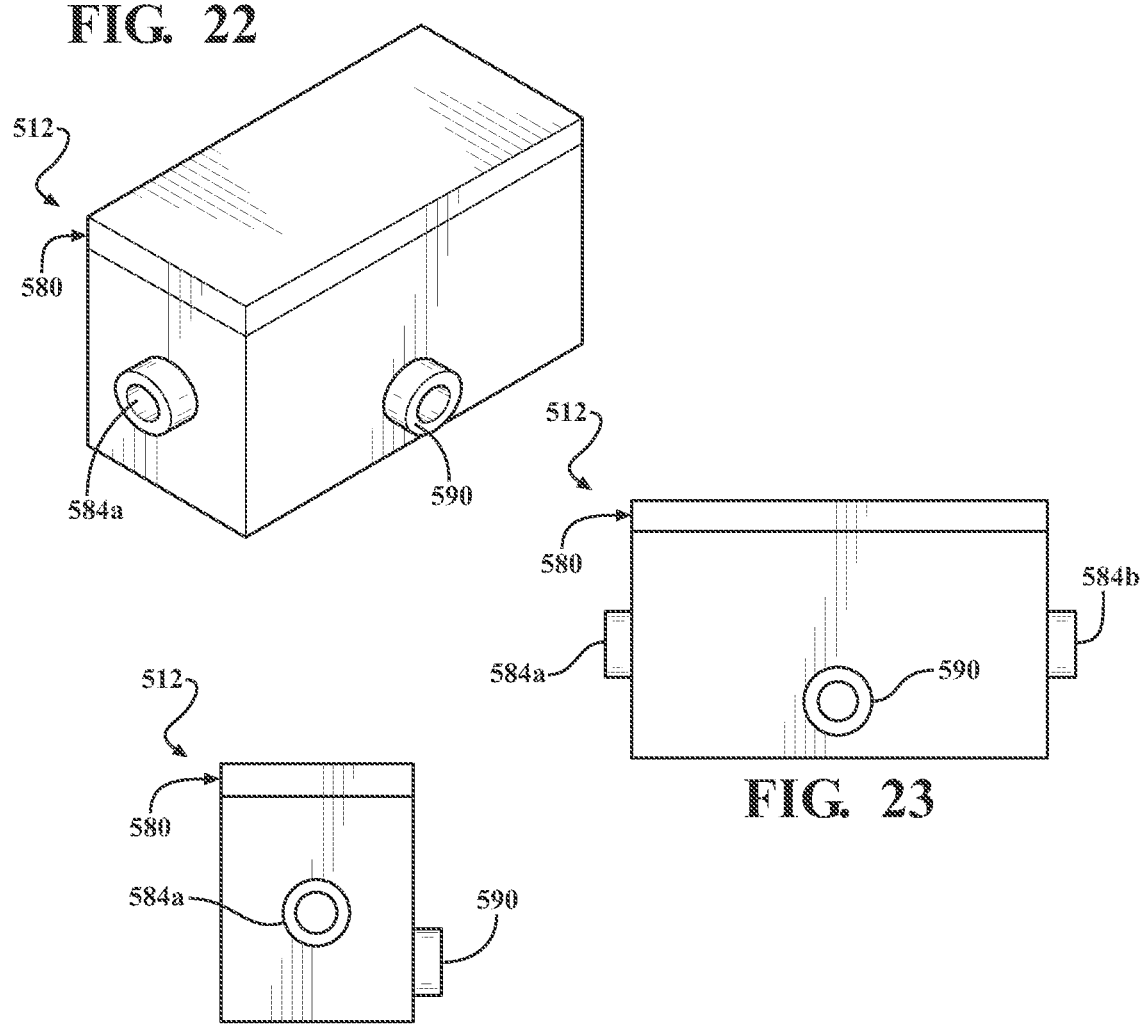
FIG. 22
FIG. 23
FIG. 24
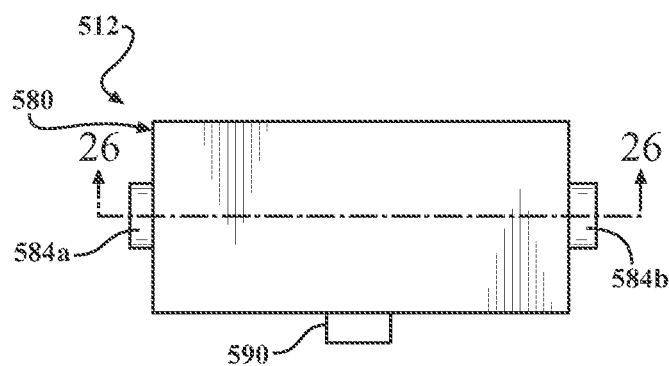
FIG. 25

BLADDER SUPPORT SYSTEM FOR A VEHICLE SEAT ASSEMBLY

TECHNICAL FIELD

The subject invention relates generally to a vehicle seat assembly having a bladder support system that includes one or more air cells and a compact, low cost valve system inflating and deflating any combination of the air cells.

SUMMARY OF THE DISCLOSURE

One example of the present invention provides a vehicle seat assembly including a seat back, a seat bottom coupled to the seat back, and a bladder support system coupled to at least one of the seat back and the seat bottom. The bladder support system includes a plurality of air cells mounted to at least one of the seat back and the seat bottom. The bladder support system further includes a pump fluidly connected to the air cells to selectively inflate the air cells when the pump receives an activation signal. In addition, the bladder support system also includes a valve system defining flow paths fluidly connected between the pump and the air cells. The valve system includes at least three control valves, with each control valve electrically controlled and movable to an open position to open a corresponding flow path and generate a control valve output when receiving the activation signal. In addition, the valve system also includes a plurality of passive valves movable to an open position to open the corresponding flow path to inflate the corresponding air cell when the passive valves receive at least three control valve outputs from the control valves. The valve system further includes a controller configured to send the activation signal to the three control valves to open the corresponding flow path and the pump to generate a flow through the opened flow path to inflate the air cell.

Another example of the present invention provides a bladder support system coupled to a vehicle seat assembly. The bladder support system includes a plurality of air cells mounted to the vehicle seat assembly and a pump fluidly connected to the air cells to selectively inflate the air cells when the pump receives an activation signal. In addition, the bladder support system also includes a valve system defining flow paths fluidly connected between the pump and the air cells. The valve system includes at least three control valves, with each control valve electrically controlled and movable to an open position to open a corresponding flow path and generate a control valve output when receiving the activation signal. In addition, the valve system also includes a plurality of passive valves movable to open positions to open the flow path to inflate the corresponding air cell when the passive valves receive at least three control valve outputs from the control valves. The valve system further includes a controller configured to send the activation signal to the three control valves to open the corresponding flow path and the pump to generate a flow through the opened flow path to inflate the air cell.

Still another example of the present invention provides a method of operating a vehicle seat assembly including a seat back, a seat bottom coupled to the seat back, and a bladder support system coupled to at least one of the seat back and the seat bottom. The bladder support system includes a plurality of air cells mounted to at least one of the seat back and the seat bottom, a pump fluidly connected to the air cells, and a valve system defining a plurality of flow paths fluidly connected between the pump and the air cells. The valve system includes a controller, at least three control valves, and a plurality of passive valves. The method includes the step of transmitting an activation signal from the controller to the three control valves and the pump. The method further includes the step of moving three control valves to an open position, when receiving the activation signal, to open a flow path and generate at least three control valve outputs corresponding with the three opened control valves. The method also includes the step of moving the passive valves to an open position to open a corresponding flow path when the passive valves receive three or more control valve outputs from the control valves. The method further includes the step of inflating the air cell corresponding with the opened flow path.

BRIEF DESCRIPTION OF THE DRAWINGS

Advantages of the present invention will be readily appreciated as the same becomes better understood by reference to the following detailed description when considered in connection with the accompanying drawings.

FIG. 13 is perspective exploded view of the signal valve assembly of FIG. 6.

FIG. 22 is a perspective view of still another embodiment of passive valves for the valve system of FIG. 1.

FIG. 23 is a front view of the passive valves of FIG. 22.

FIG. 24 is an end view of the passive valves of FIG. 22.

FIG. 25 is a top view of the passive valves of FIG. 22.

DETAILED DESCRIPTION

Referring to the Figures, like numerals indicate like or corresponding parts throughout the several views of a vehicle seat assembly 100. The vehicle seat assembly 100 includes a seat back 102, a seat bottom 104 coupled to the seat back 102, and a bladder support system 106 coupled to the seat back 102 or the seat bottom 104 to provide adjustable support for a passenger. The bladder support system 106 can selectively inflate and deflate a plurality of air cells to provide dynamic support to an occupant positioned on the vehicle seat assembly 100 by, for example, applying a massage including kneading, vibration, friction, or percussion to the tissue of the passenger. However, it is contemplated that the bladder support system can be configured to provide stationary support and apply constant pressure to one or more parts of the passenger's body.

Figure 1:
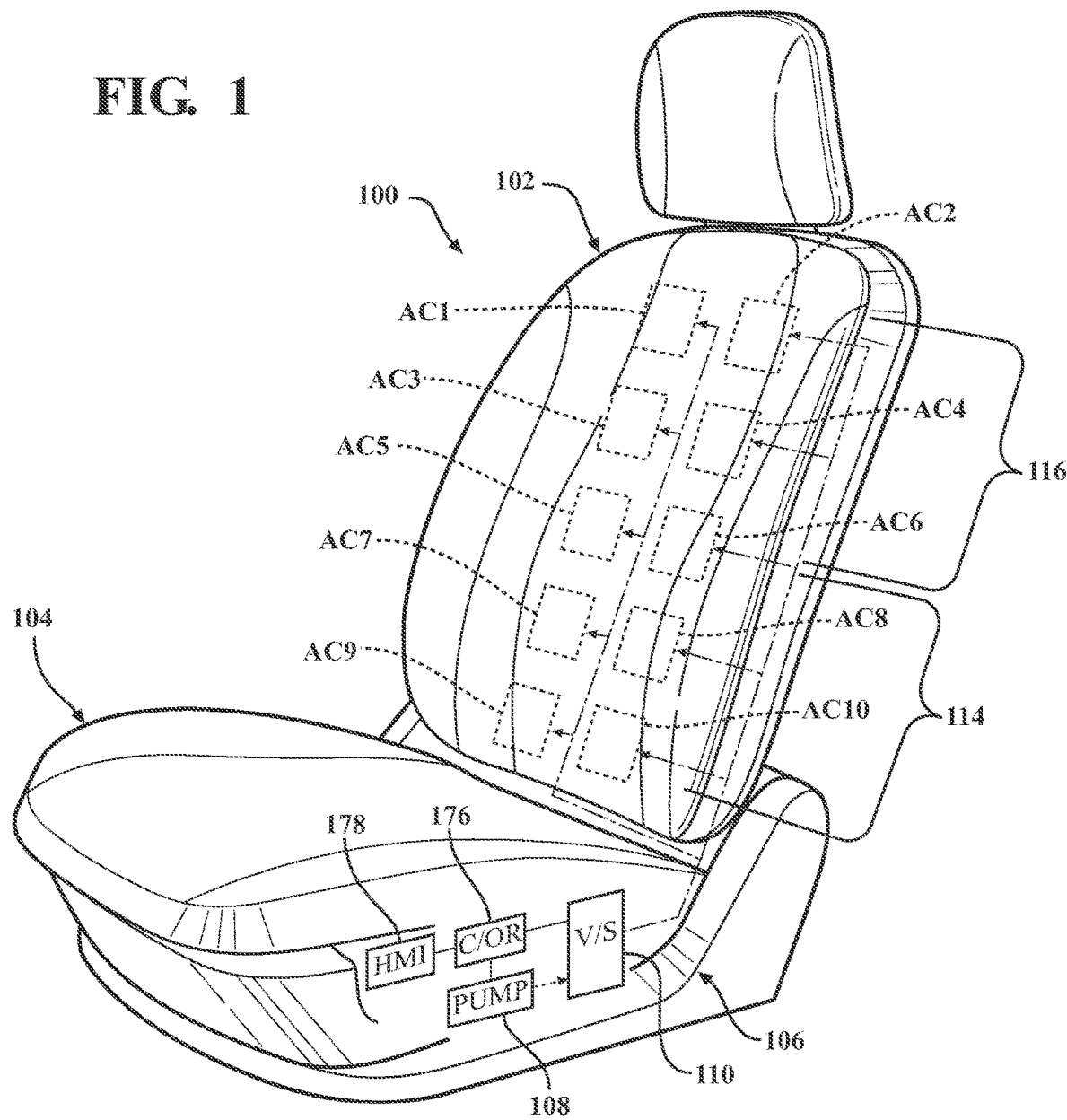
FIG. 1 is a perspective view of a first embodiment of a vehicle seat assembly having a seat bottom, a seat back coupled to the seat bottom, and a bladder support system coupled to the seat back and the seat bottom.
Figure 2:
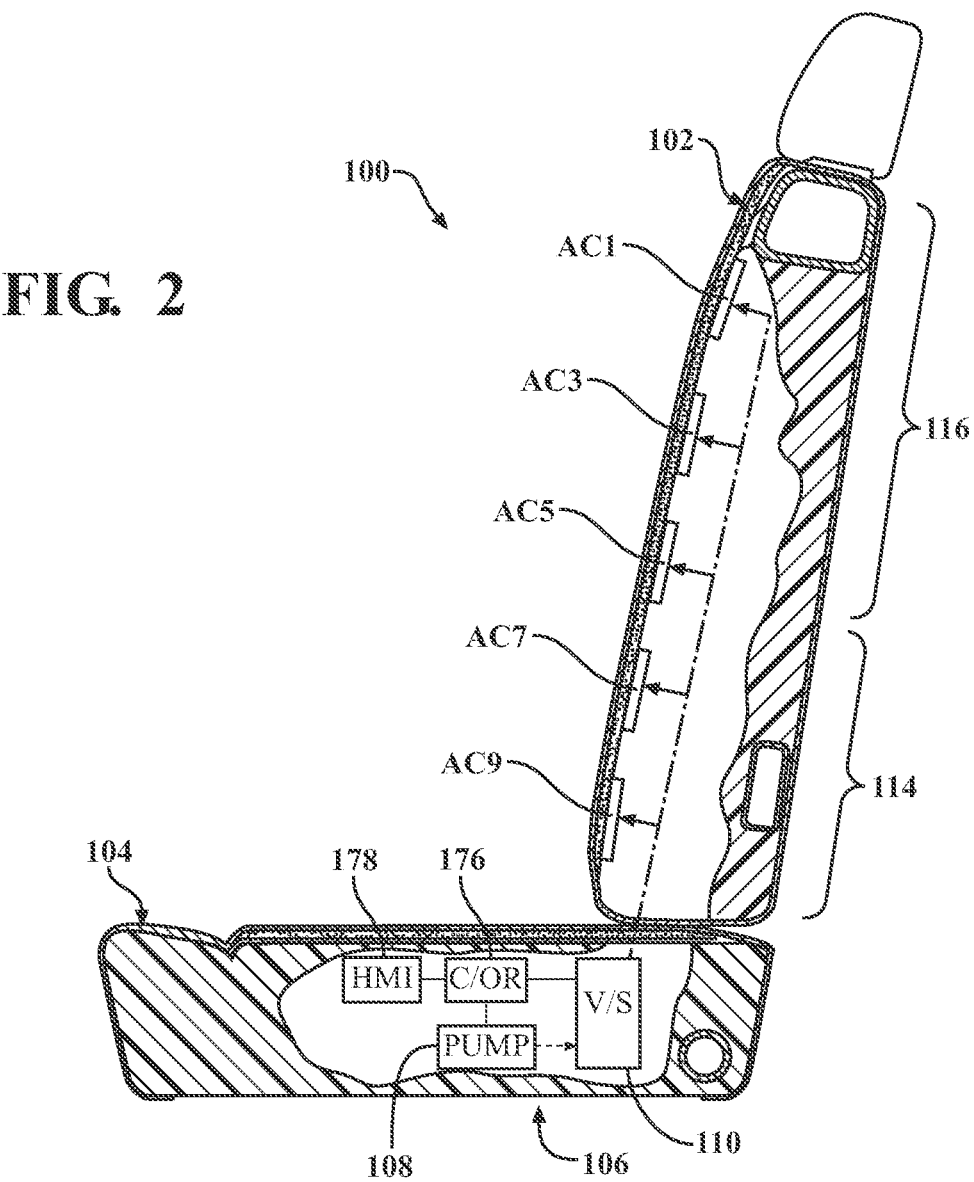
FIG. 2 is a cross-sectional view of the vehicle seat assembly of FIG. 1, illustrating the bladder support system having the air cells, a pump, and a valve system fluidly connected between the pump and the air cells.

Referring to FIGS. 1 and 2, the bladder support system 106 includes a plurality of air cells AC1-AC36 (FIG. 4) adapted to be mounted to the seat back 102 and a pump 108 fluidly connected to the air cells to selectively inflate the same when the pump 108 receives an activation signal. As described in greater detail below in connection with FIG. 4, the bladder support system 106 further includes a valve system 110 fluidly connected between the pump 108 and the air cells AC1-AC36. The valve system 110 includes at least three control valves CV1-CV8 and a plurality of passive valves 112 fluidly connected between each control valve and the corresponding air cells. The passive valves 112 open flow paths for inflating any one of the air cells AC1-AC36 when receiving three or more control valve outputs from the control valves. While the control valves CV1-CV8 include electronic components, the passive valves 112 are pneumatically activated and do not include any electronic components. Accordingly, the valve system including the passive valves may have a lower cost, occupy less volume, have a lower weight, and distribute air to more air cells, as compared to a valve system consisting of only electrically-activated control valves.

Referring to FIGS. 1 and 2, the seat back 102 includes a lower lumbar region 114 and an upper lumbar region 116 above the lower lumbar region 114, with thirty-six air cells mounted to the lower and upper lumbar regions 114, 116. The air cells may be spaced apart from one another and arranged in two columns in each of the lower and upper lumbar regions 114, 116. However, the bladder support system can include any number of air cells arranged in any pattern and mounted to any portion of the upper lumbar region or the lower lumbar region.

Figure 3:
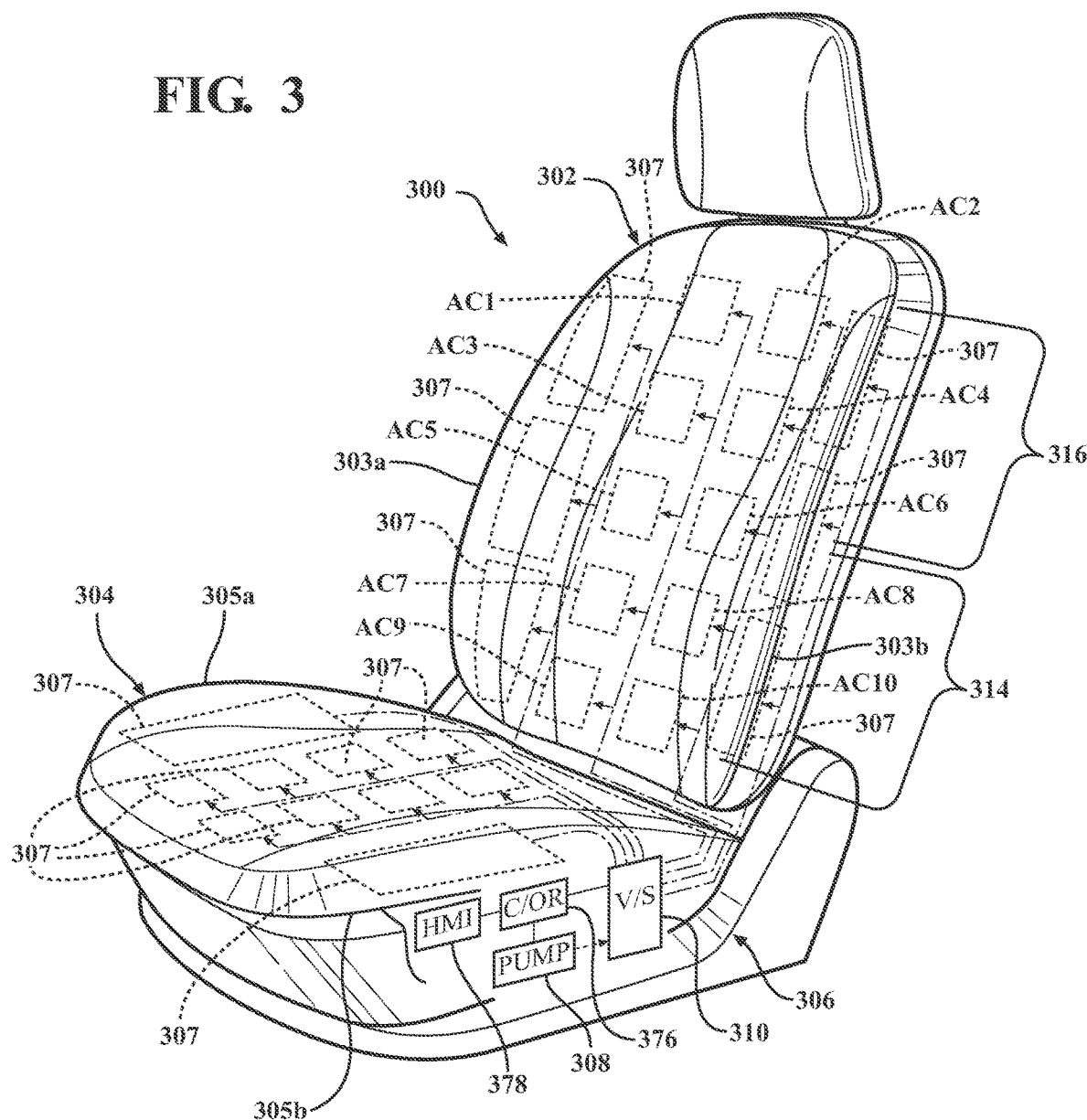
FIG. 3 is a perspective view of another embodiment of a vehicle seat assembly having a bladder support system including air cells mounted to the seat bottom, the seat back, and the side bolsters.

Referring to FIG. 3, another embodiment of the vehicle seat assembly 300 is similar the vehicle seat assembly 100 of FIGS. 1 and 2 and includes the same or similar components identified by the same reference numbers increased by 200. However, while the vehicle seat assembly 100 of FIGS. 1 and 2 includes air cells mounted only to the seat back 102, the vehicle seat assembly 300 further includes air cells AC mounted to the seat bottom 304, a pair of side bolsters 303a, 303b positioned on inboard and outboard sides of the seat back 302, and a pair of side bolsters 305a, 305b positioned on inboard and outboard sides of the seat bottom 304.

It is contemplated that any number of air cells having the same size or different sizes relative to one another can be spaced apart or adjacent to one another and mounted to the seat bottom, seat back, side bolsters of the seat back, side bolsters of the seat bottom, a head rest, other portions of the vehicle seat assembly, or any combination thereof.

Figure 4:
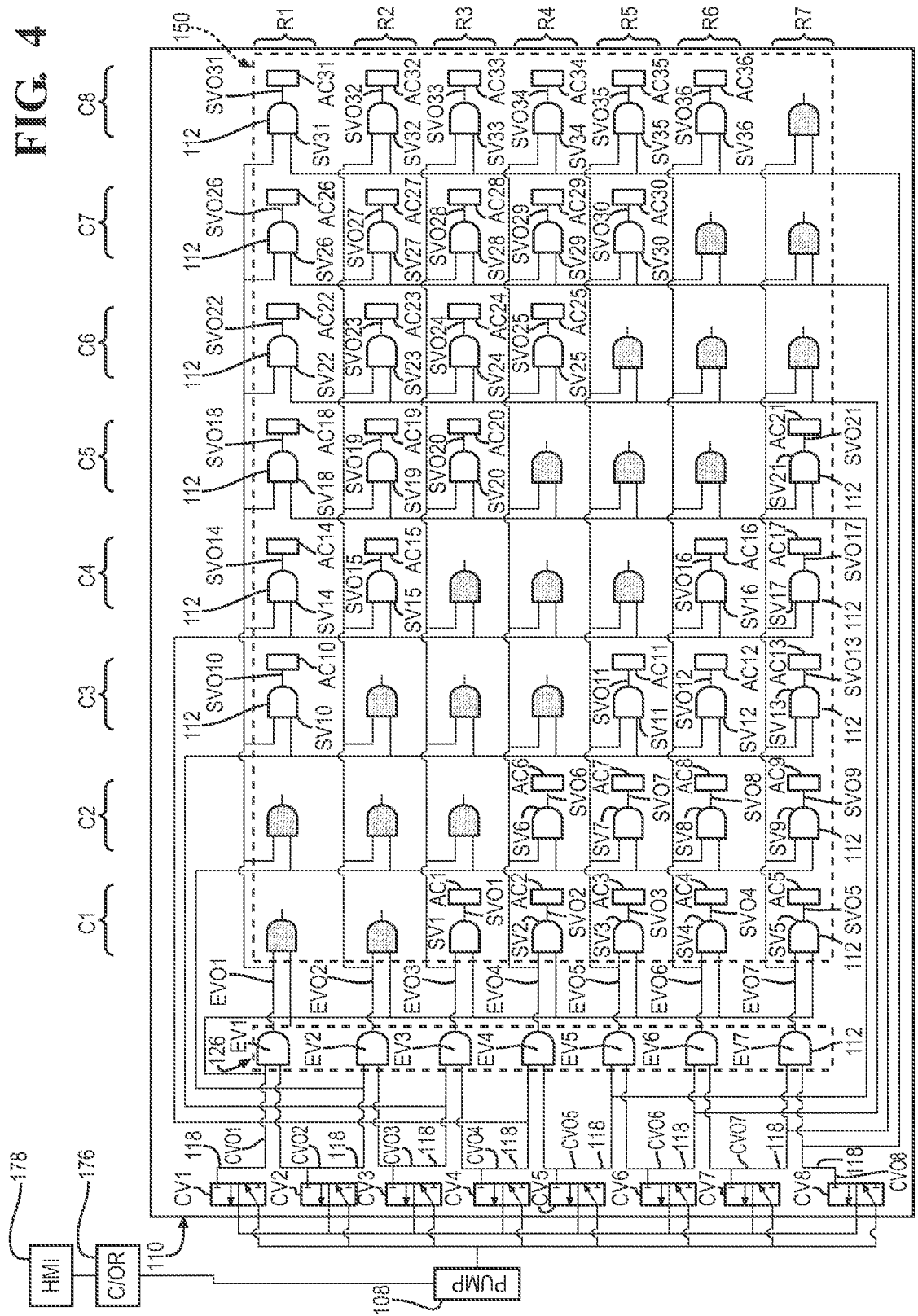
FIG. 4 is a schematic diagram of the bladder support system of FIG. 2, illustrating the valve system having a plurality of control valves and a plurality of passive valves including an enable valve assembly and a signal valve assembly.
Figure 5:
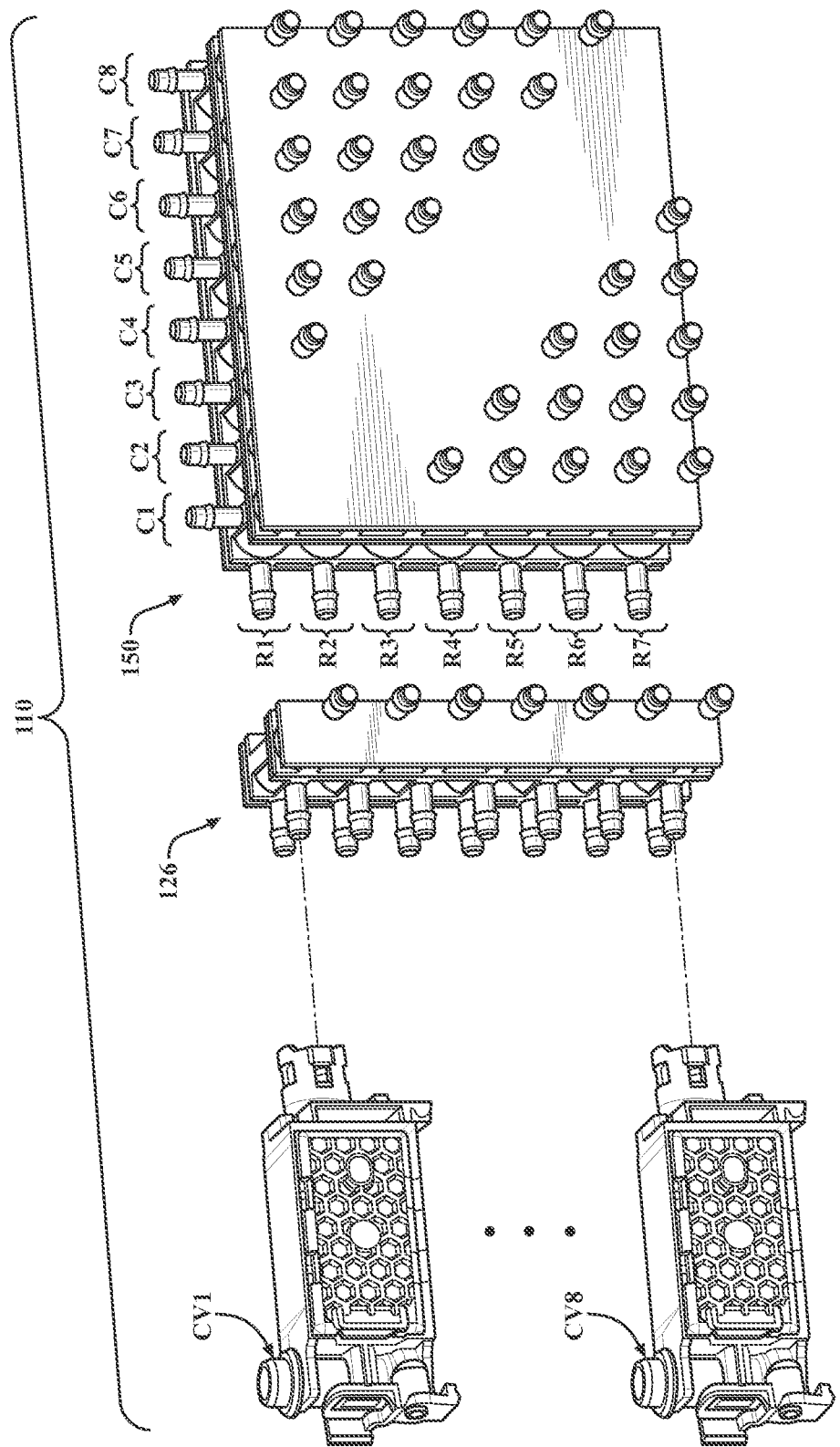
FIG. 5 is an exploded perspective view of the valve system of FIG. 4.

Referring to FIG. 4, the valve system 110 defines a plurality of flow paths 118 fluidly connected between the pump 108 and the air cells AC1-AC36. The valve system 110 includes eight control valves CV1-CV8. However, it is contemplated that the valve system can include more or fewer than eight control valves CV1-CV8. Each control valve CV1-CV8 is electrically controlled and movable to an open position to open a corresponding flow path and generate corresponding control valve outputs CVO1-CVO8 when receiving the activation signal. Multiple pairs of control valves CV1-CV8 are positioned adjacent to one another and can be electrically activated to move to open positions and send a flow from the pump 108 through the corresponding opened flow path. Each control valve CV1-CV8 may include electromagnetic or shape memory valve actuation. However, it is contemplated that the control valves can be electrically controlled by any suitable actuator.

As best shown in FIG. 4, the valve system 110 further includes the passive valves 112 fluidly connected between the control valves CV1-CV8 and the air cells AC1-AC36. The passive valves 112 are movable to open positions to open corresponding flow paths to inflate corresponding air cells when the passive valves 112 receive the three or more control valve outputs from the control valves CV1-CV8. Each passive valve 112 is a normally-closed valve to block flow from the pump 108 to the air cell and normally exhausted to the atmosphere to deflate the corresponding air cell.

Referring to FIGS. 4 through 7, the passive valves 112 include a stacked arrangement of enable valves EV1-EV7 and signal valves SV1-SV36, which are fluidly connected to the enable valves EV1-EV7 and the control valves CV1-CV8. Each of the enable valves and signal valves is a pneumatically-actuated 2-input valve fluidly connected in series with the other passive valve. In this stacked arrangement, each of the enable valves and signal valves is movable to an open position to open a corresponding flow path when receiving a first pneumatic input and simultaneously flow air through the opened flow path when receiving a second pneumatic input.

Referring to FIGS. 6 and 8 through 12, the enable valves EV1-EV7 are arranged in a column relative to one another and as integral parts of the enable valve assembly 126. Each enable valve EV1-EV7 is fluidly connected to two of the control valves CV1-CV8. In addition, each enable valve EV1-EV7 is movable from a closed position (FIGS. 11A and 12A) to an open position (FIGS. 11B and 12B) to open the corresponding flow path and generate corresponding enable valve outputs EVO1-EVO7 when receiving two of the control valve outputs CVO1-CVO8 from corresponding control valves CV1-CV8. As just one example, control valves CV4, CV5 (FIGS. 4 and 6) can be electrically activated to move to open positions and generate two corresponding control valve outputs CVO4, CVO5. Enable valve EV4 can move to the open position (11B and 12B) to open a corresponding flow path and generate an enable valve output EVO4 when receiving the control valve outputs CVO4, CVO5 from control valves CV4, CV5.

Figure 11A:
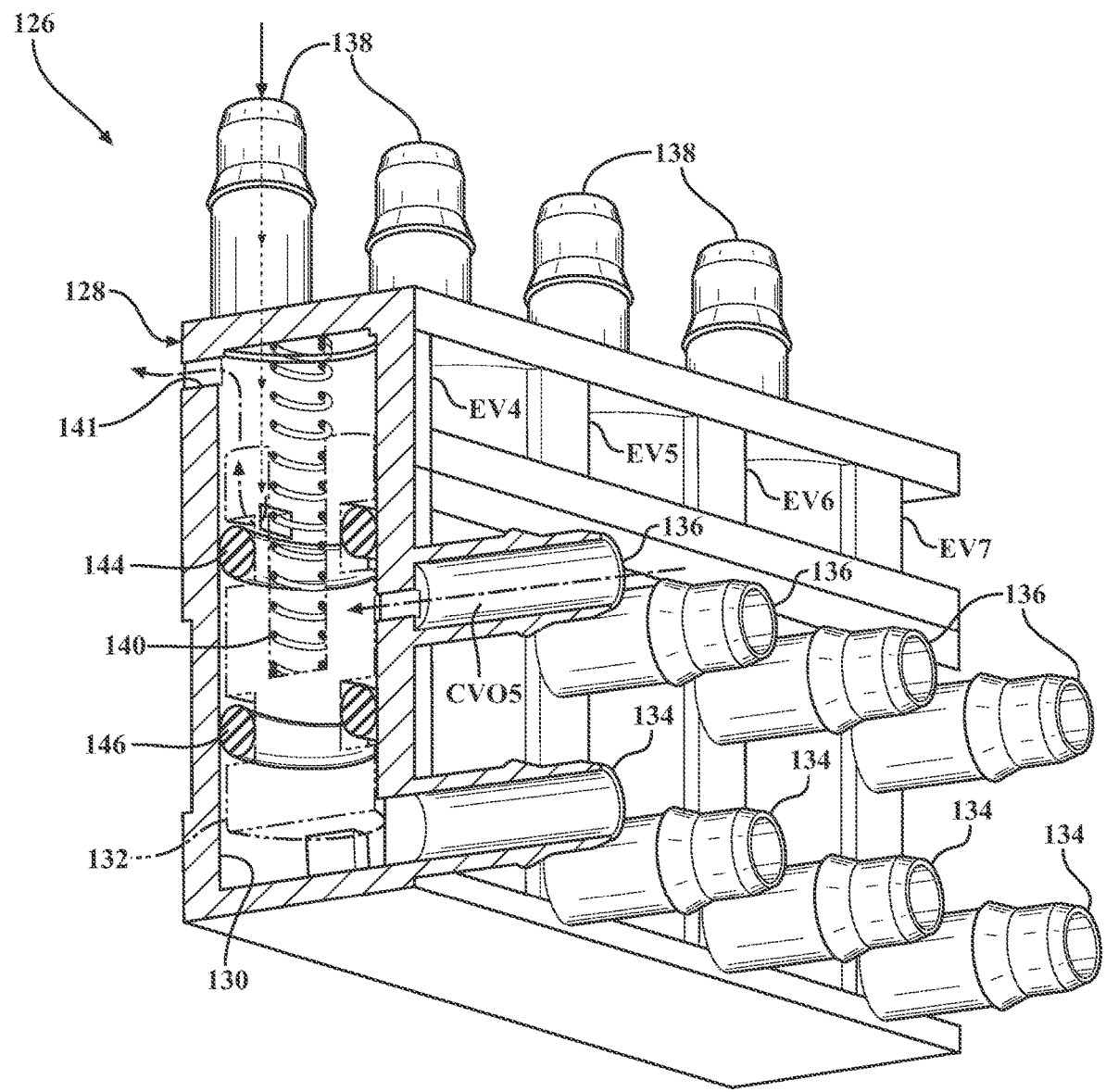
FIG. 11A is another perspective cross-sectional view of the enable valve assembly of FIG. 6, as taken along line 10-10, illustrating the enable valve in the closed position.
Figure 11B:
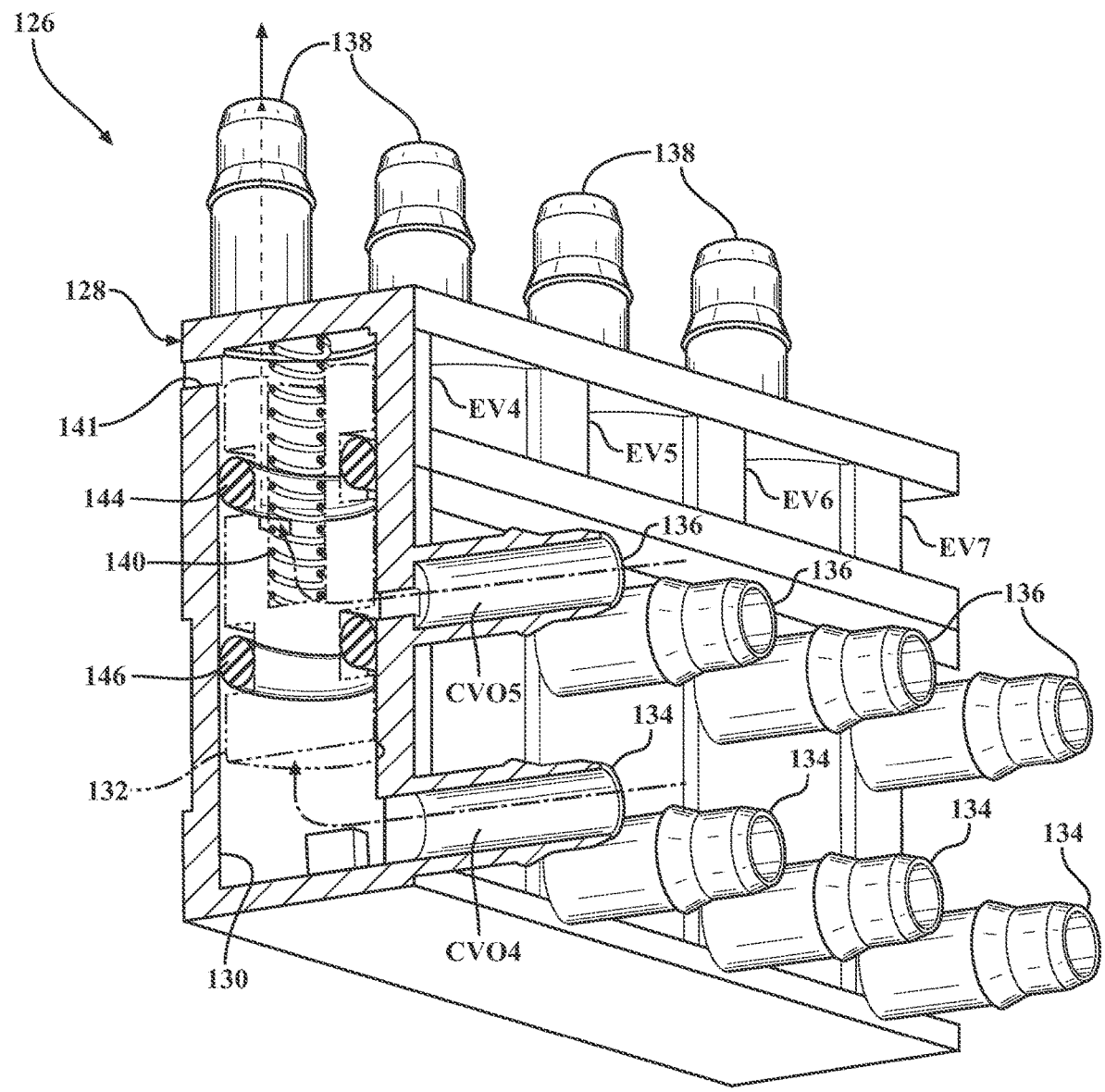
FIG. 11B is a perspective cross-sectional view of the enable valve assembly of FIG. 6, as taken along line 10-10, illustrating the enable valve in the open position.
Figure 12A:
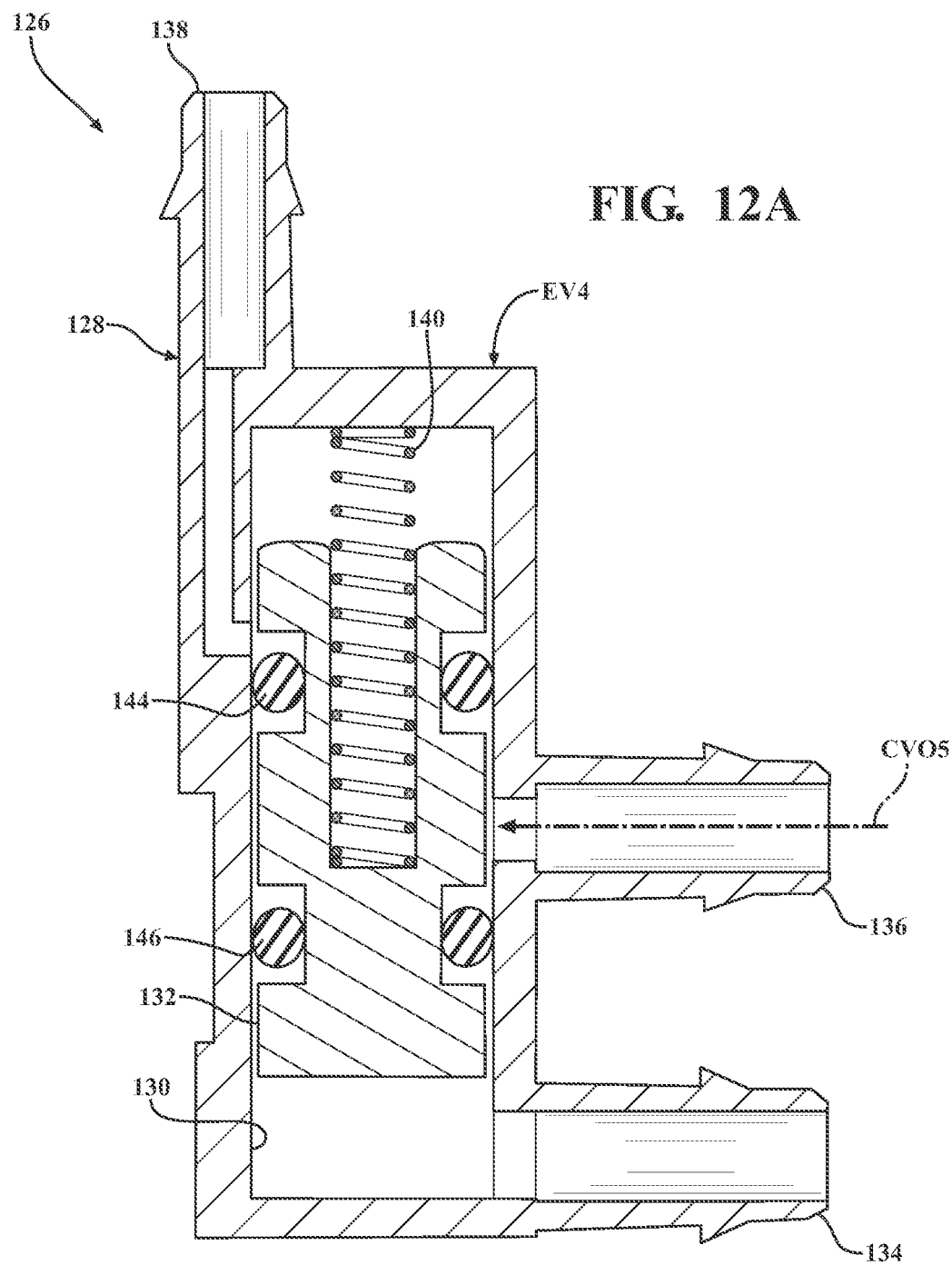
FIG. 12A is a cross-sectional view of the enable valve assembly of FIG. 6, as taken along line 12-12, illustrating the enable valve in the closed position.
Figure 12B:
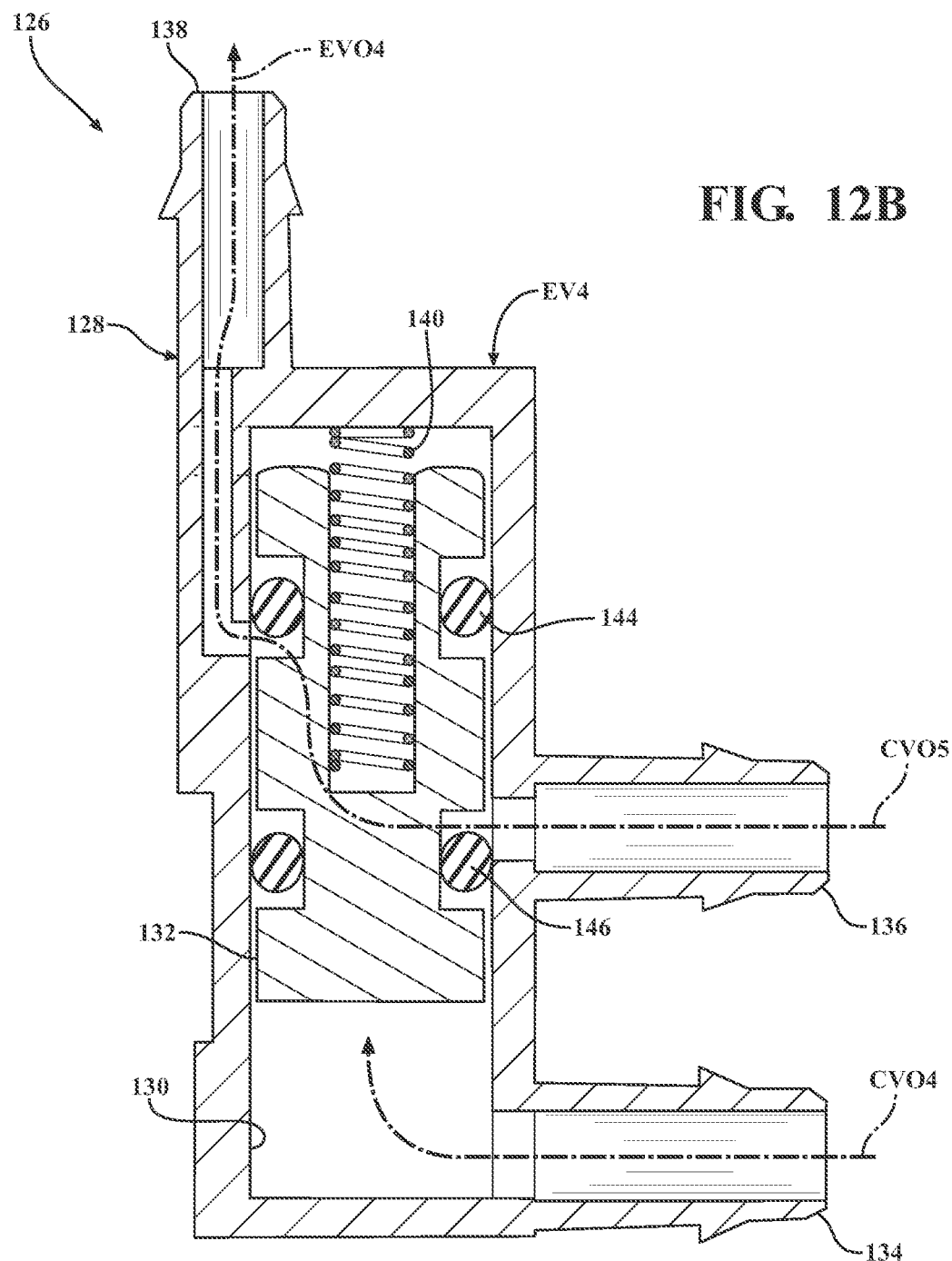
FIG. 12B is a cross-sectional view of the enable valve assembly of FIG. 6, as taken along line 12-12, illustrating the enable valve in the open position.

Referring to FIGS. 8 through 12B, the enable valve assembly 126 includes a body 128. For each one of the enable valves EV1-EV7, the body 128 forms a cavity 130 with a piston 132 movable within the cavity 130 between the closed position (FIGS. 11A and 12A) and the open position (FIGS. 11B and 12B). In addition, the body 128 also includes an actuation inlet port 134 and a supply inlet port 136, which are fluidly connected between the cavity 130 and two corresponding control valves CV1-CV8 to receive the control valve outputs from the same. The body 128 further includes an outlet port 138 to flow the enable valve output when the actuation inlet port 134 receives a first control valve output from a first control valve to move the piston 132 to the open position and the supply inlet port 136 receives a second control valve output from a second control valve. Continuing with the previous example illustrated in FIGS. 11B and 12B, the enable valve EV4 may have the outlet port 138 for flowing the enable valve output EVO4 when the actuation inlet port 134 receives the control valve output CVO4 from the control valve CV4 to move the piston 132 to the open position and the supply inlet port 136 receives the control valve output CVO5 from the control valve CV5.

Each one of the enable valves EV1-EV7 is a normally-closed valve including a spring 140 configured to move the piston 132 to the closed position (FIGS. 11A and 12A) to block the corresponding flow path between the supply inlet port 136 and the outlet port 138. The body 128 also forms an exhaust port 141 fluidly connected between the atmosphere and the outlet port 138 to deflate the corresponding air cell when the piston 132 is moved to the closed position (FIGS. 11A and 12A). Each one of the enable valves EV1-EV7 includes a first seal 144 carried by the piston 132 and configured to block fluid communication between the outlet port 138 and the supply inlet port 136 when the piston 132 is moved to the closed position. In addition, each one of the enable valves EV1-EV7 also includes a second seal 146 carried by the piston 132 and configured to block fluid communication between the actuation inlet port 134 and each of the other ports 136, 138, 142. The actuation inlet port 134 receives a control valve output greater than the force of the spring 140 when moving the piston 132 to the open position (FIGS. 11B and 12B) and fluidly connecting the supply inlet port 136 and the outlet port 138 to one another.

Referring back to FIG. 4, each one of the signal valves SV1-SV36 is a 2-input valve fluidly connected directly to one of the control valves CV1-CV8 and one of the enable valves EV1-EV7. The signal valves SV1-SV36 are arranged in a matrix having a plurality of rows R1-R7 and a plurality of columns C1-C8 intersecting the rows to form integral parts of a signal valve assembly 150 (FIGS. 13 through 15B). Each row R1-R7 of signal valves is fluidly connected directly to a corresponding one of the seven enable valves EV1-EV7, and each column C1-C8 of signal valves is fluidly connected directly to a corresponding one of the eight control valves CV1-CV8.

Figure 14A:
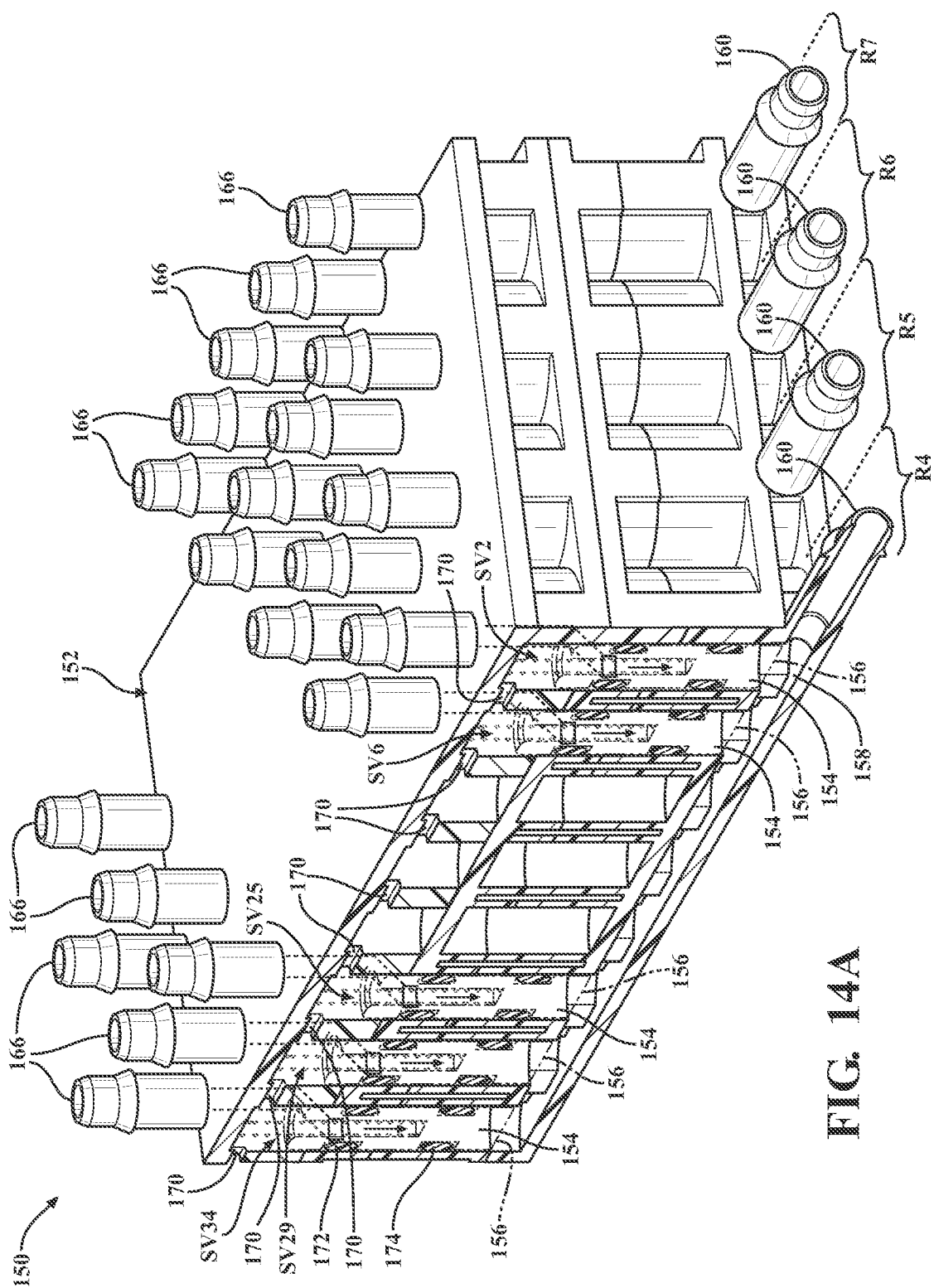
FIG. 14A is perspective cross-sectional view of the signal valve assembly of FIG. 6, as taken along line 14-14, illustrating all of the signal valves in a fourth row in a closed position.
Figure 14B:
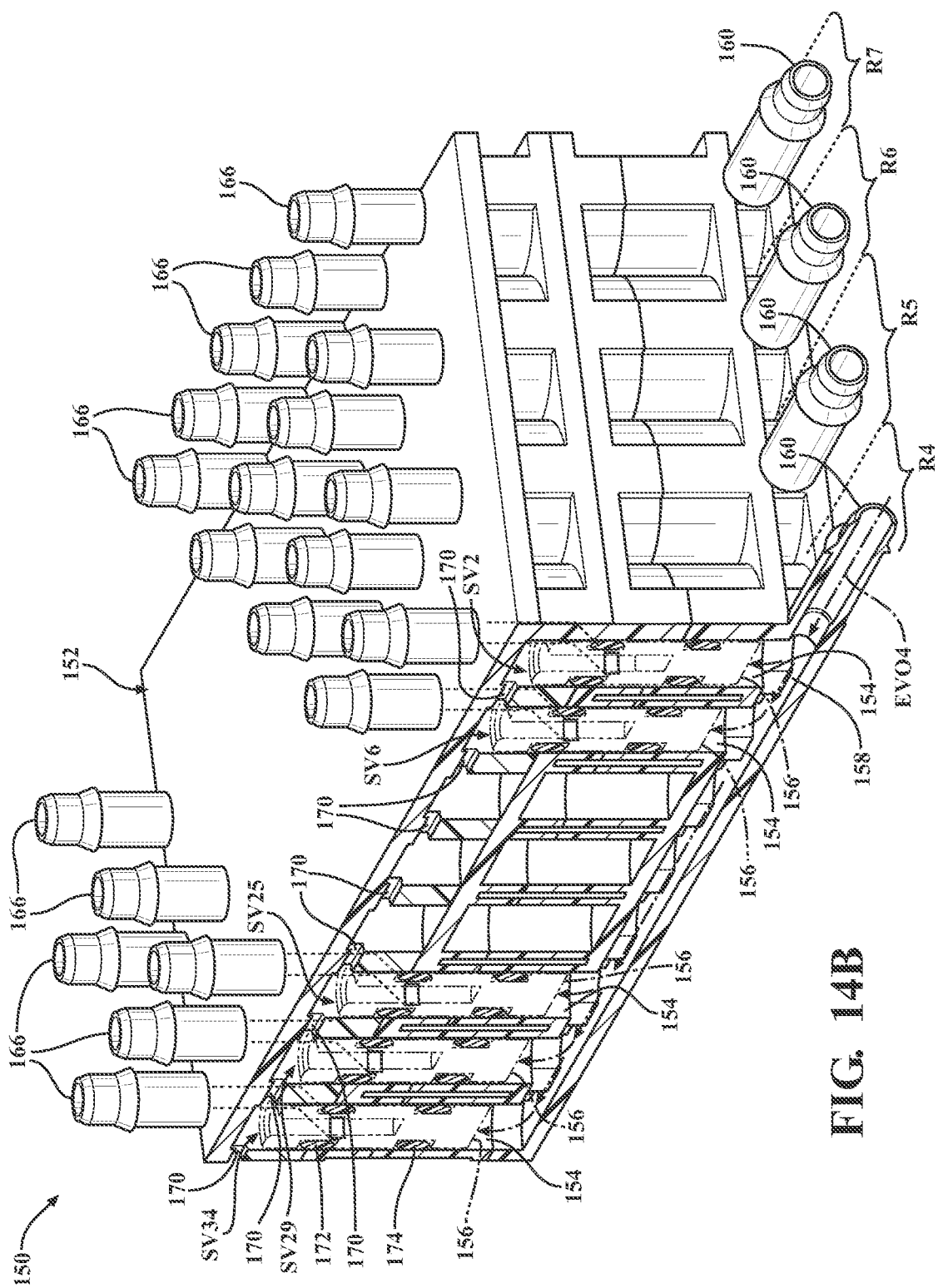
FIG. 14B is perspective cross-sectional view of the signal valve assembly of FIG. 6, as taken along line 14-14, illustrating all of the signal valves in the fourth row in an open position.
Figure 15A:
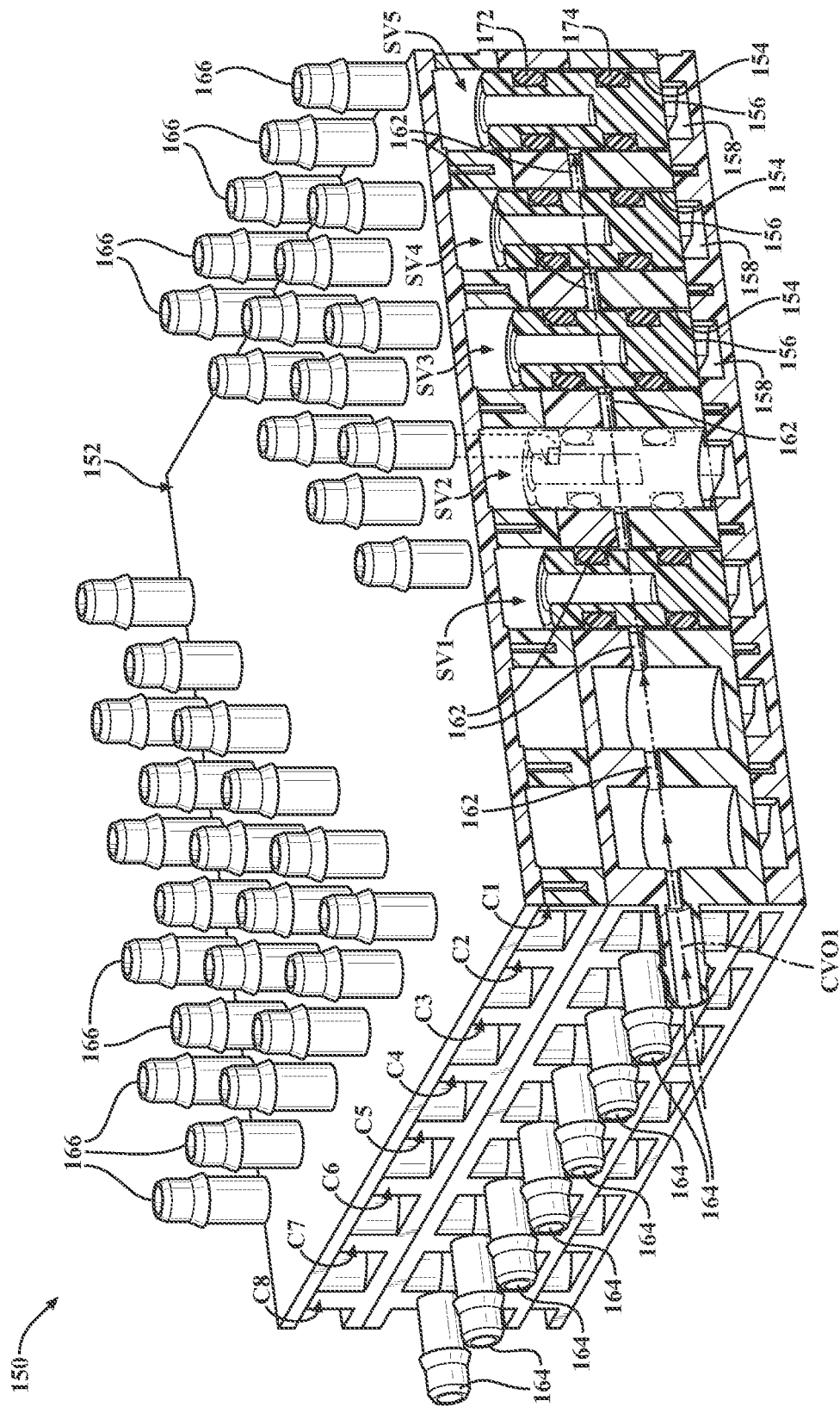
FIG. 15A is perspective cross-sectional view of the signal valve assembly of FIG. 6, as taken along line 15-15, illustrating all of the signal valves in a first column in a closed position.
Figure 15B:
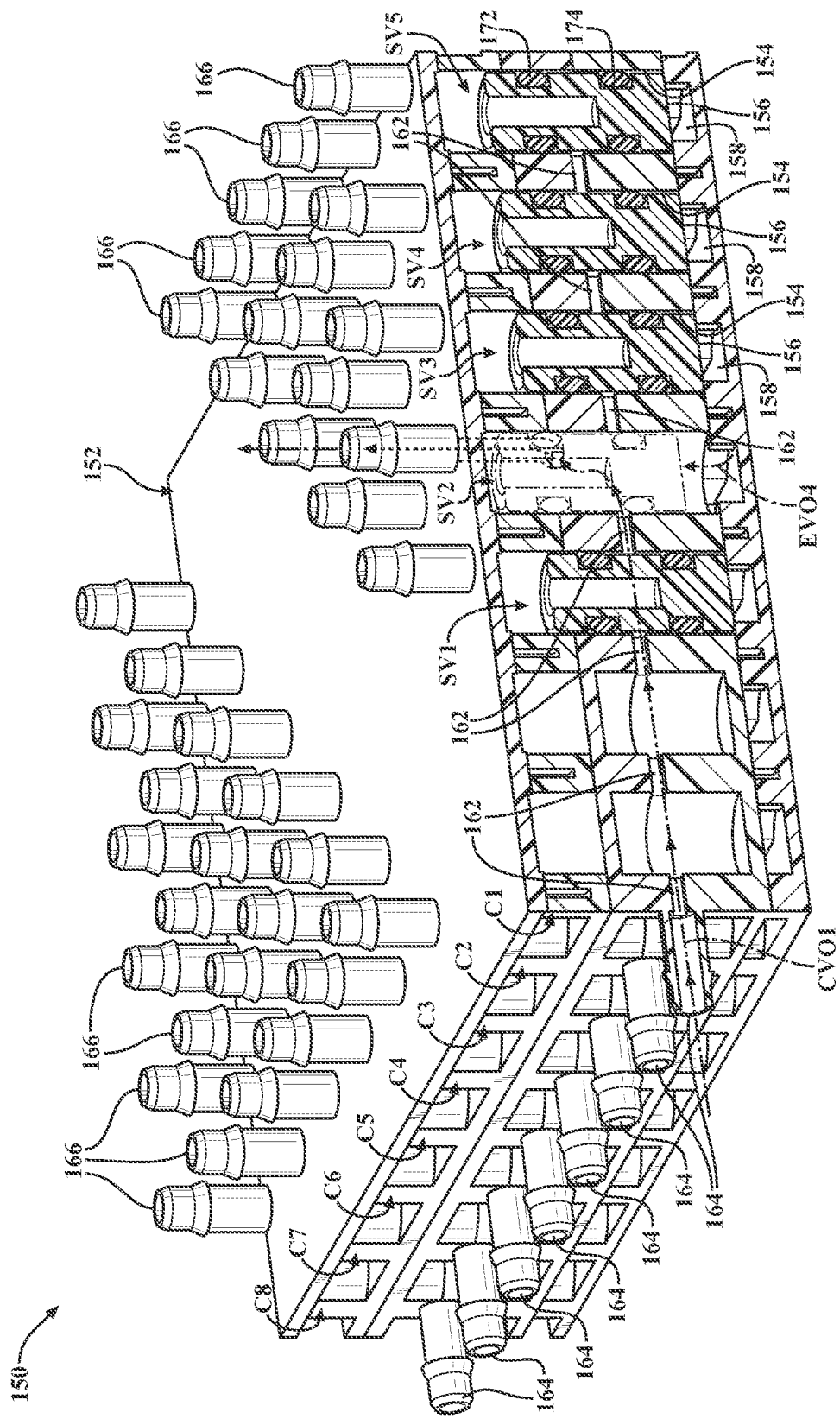
FIG. 15B is perspective cross-sectional view of the signal valve assembly of FIG. 6, as taken along line 15-15, illustrating the signal valve in the fourth row of the first column in an open position.

Referring to FIGS. 4 and 13 through 15B, the signal valve assembly 150 includes a body 152 forming a plurality of cavities 154 with a plurality of pistons 156 movable within corresponding cavities 154 between the closed position (FIGS. 14A and 15A) and the open position (FIGS. 14B and 15B).

Figure 6:
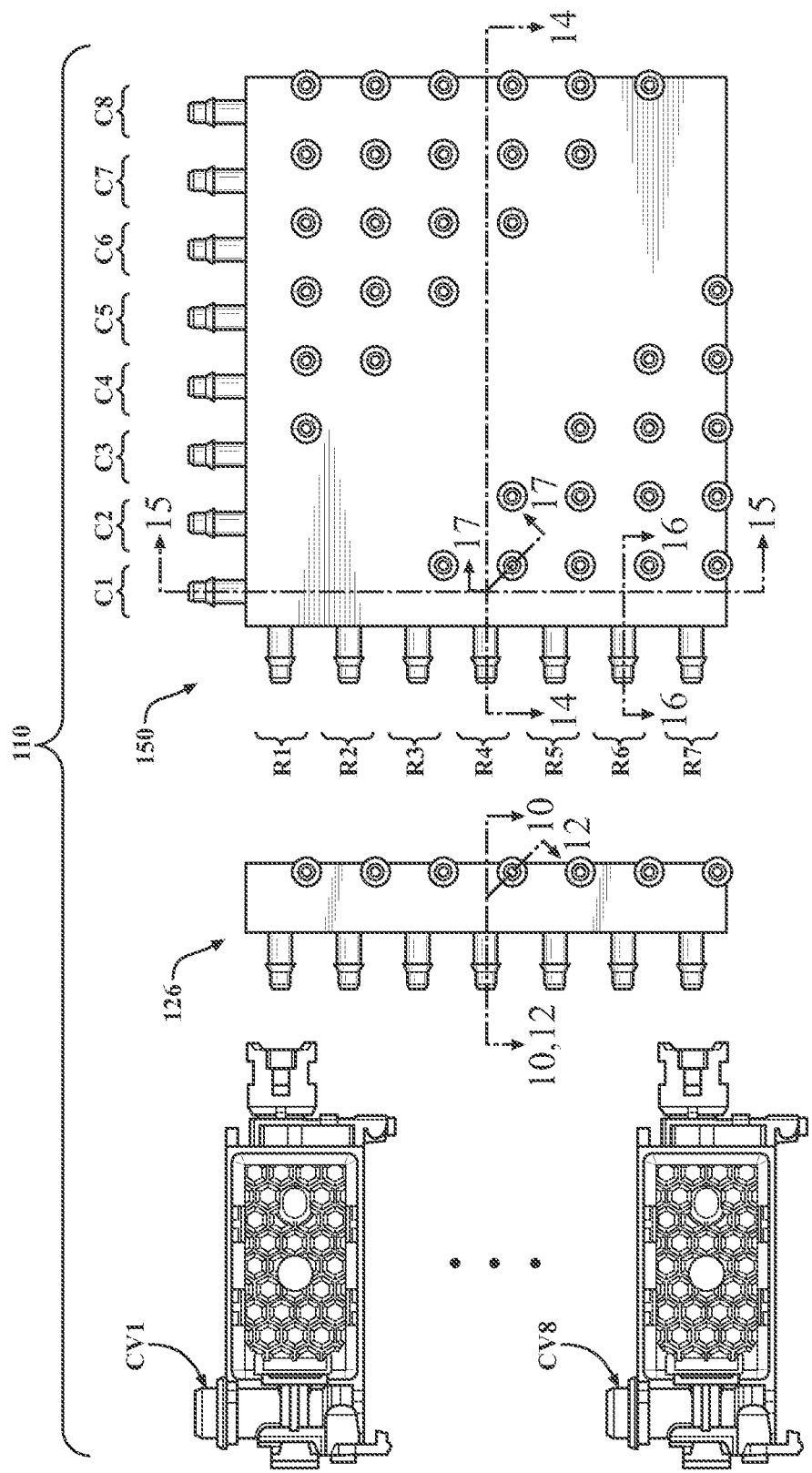
FIG. 6 is an exploded top view of the valve system of FIG. 5.
Figure 7:
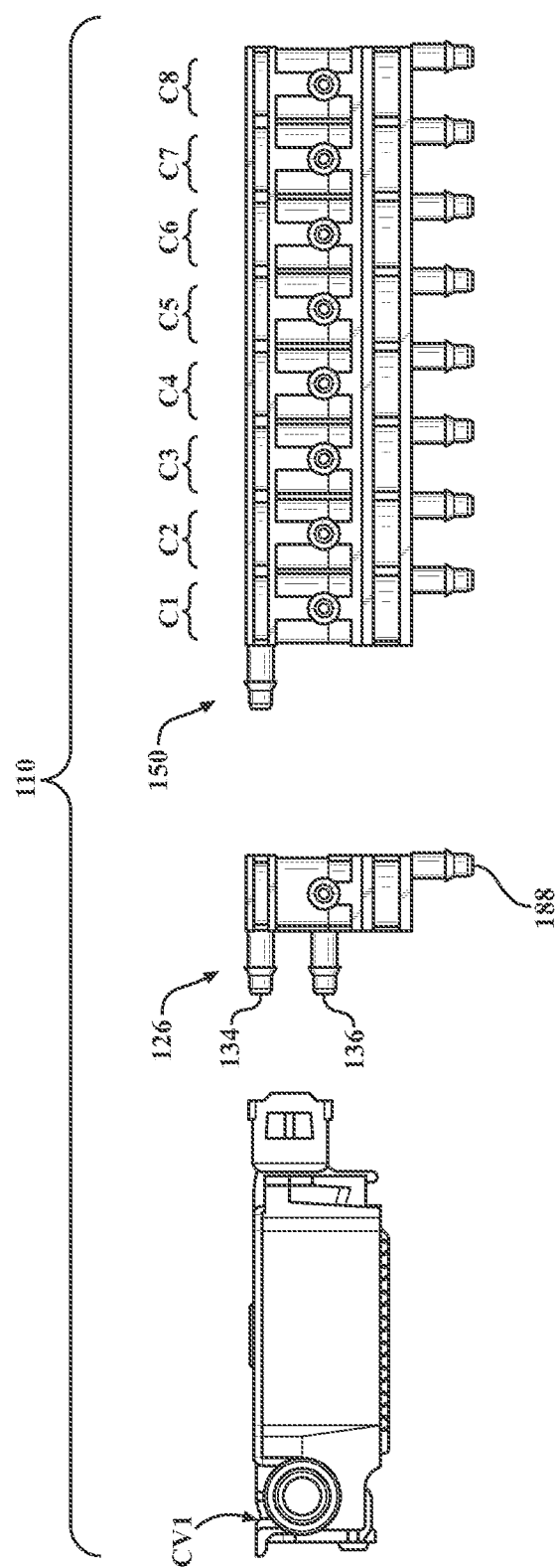
FIG. 7 is an exploded side view of the valve system of FIG. 5.
Figure 8:
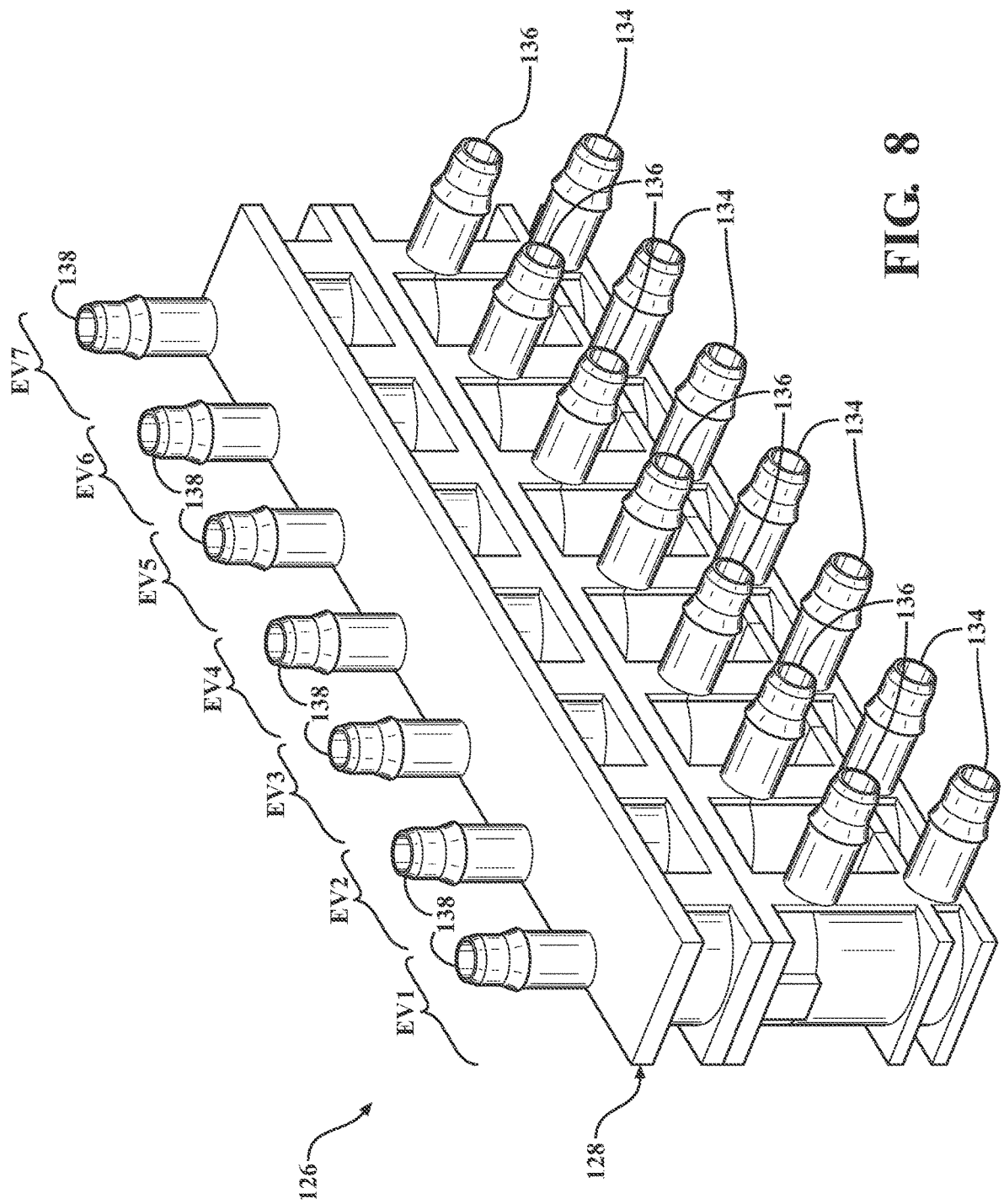
FIG. 8 is a perspective view of the enable valve assembly of FIG. 5.
Figure 9:
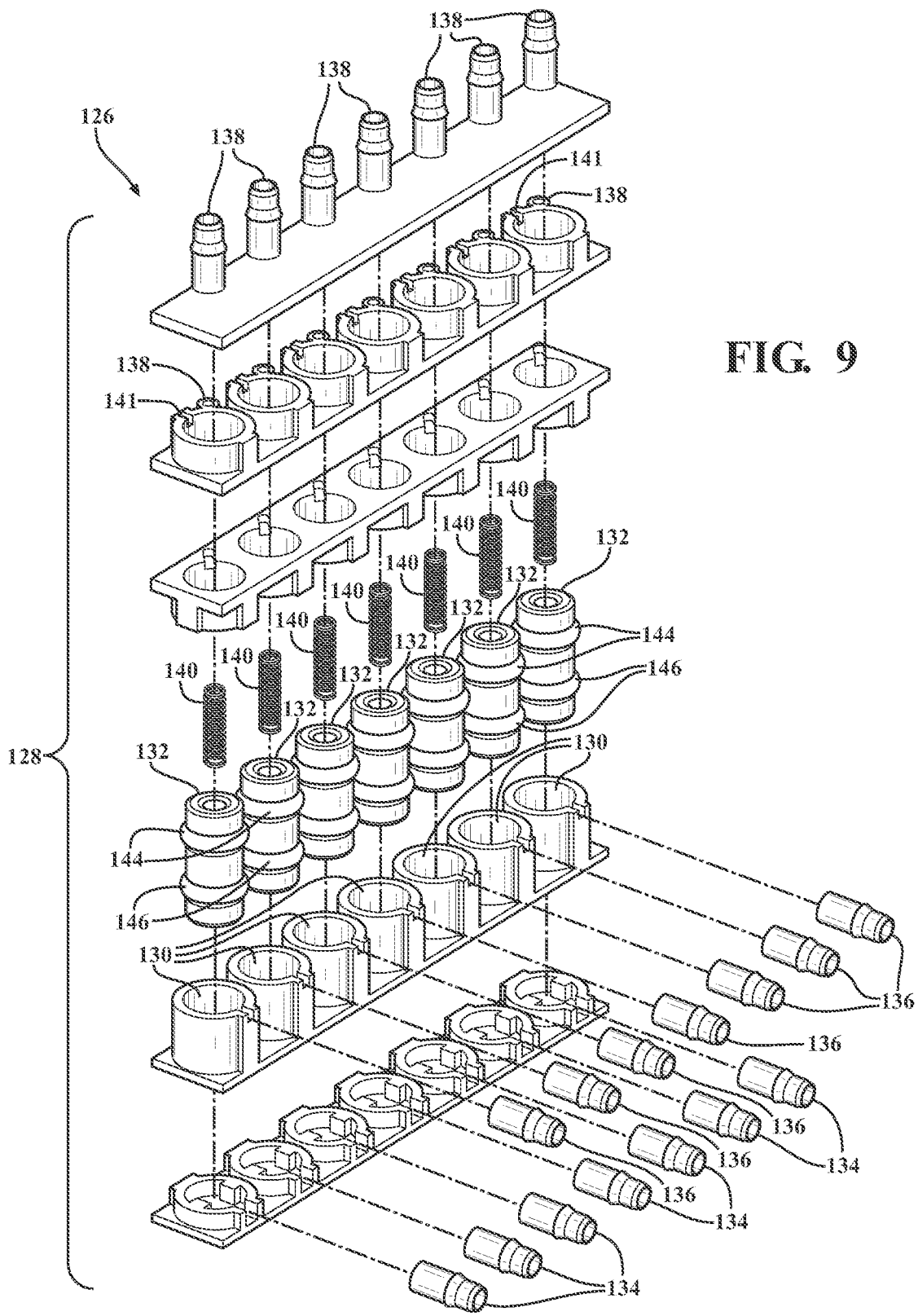
FIG. 9 is an exploded perspective view of the enable valve assembly of FIG. 8.
Figure 10:
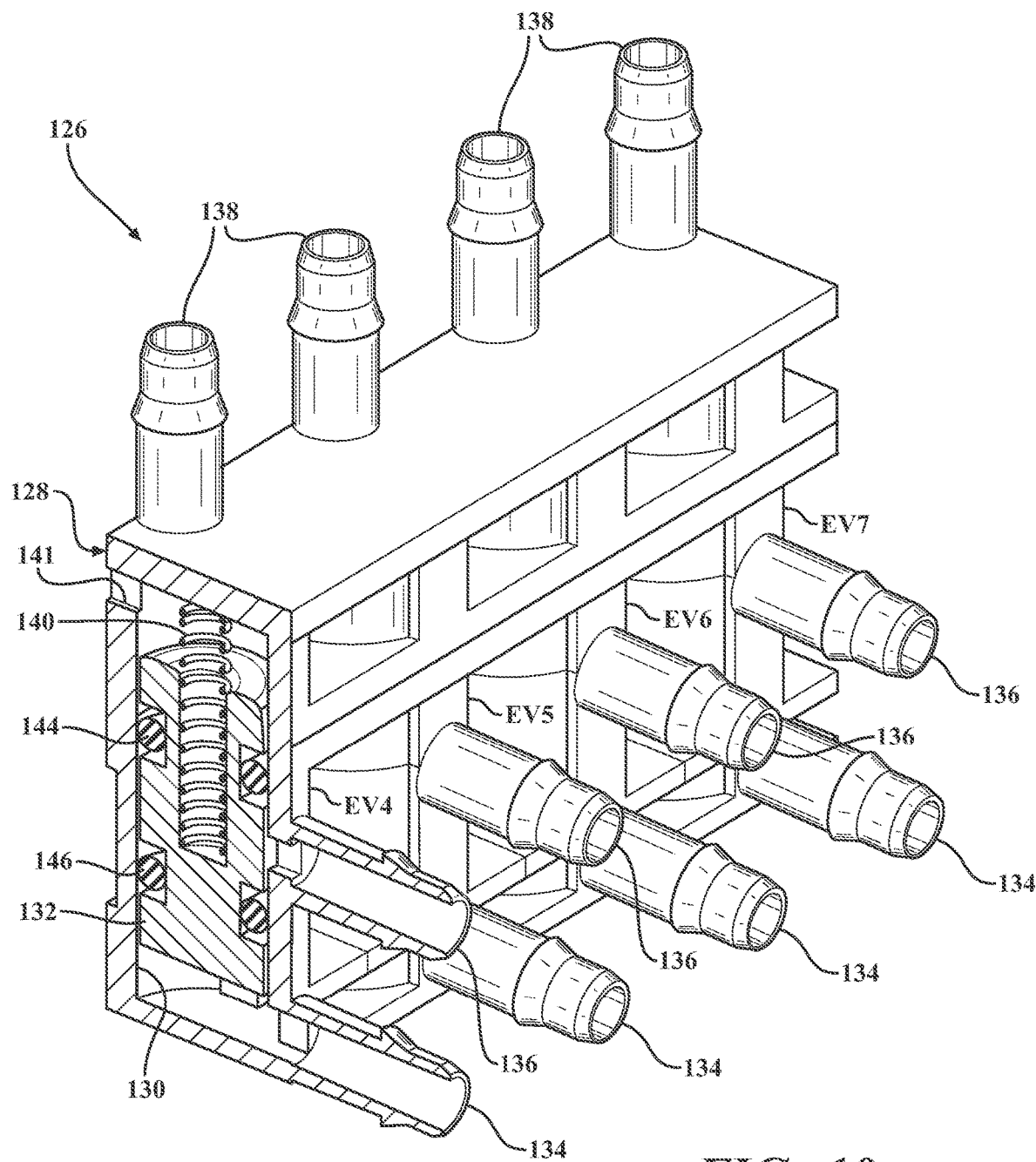
FIG. 10 is a perspective cross-sectional view of the enable valve assembly of FIG. 6, as taken along line 10-10.

Referring to FIGS. 13, 14A, and 14B, the body 152 forms a plurality of actuation passages 158 fluidly connecting the cavities 154 within each row to one another. The body 152 also includes a plurality of actuation inlet ports 160, with each actuation inlet port 160 fluidly connecting the rows R1-R7 of cavities 154 to a corresponding one of the enable valves EV1-EV7, such that all the signal valves in each row are simultaneously movable from a closed position to an open position when the row of signal valves receives the enable valve output from the corresponding enable valve. Continuing with the previous example, the actuation inlet port 160 that corresponds with row R4 (FIGS. 14A and 14B) fluidly connects the entire row R4 of cavities 154 to the enable valve EV4 (FIGS. 4 and 6). The entire row R4 of cavities 154 receives a flow of air to move the pistons 156 from closed position (FIGS. 14A and 16A) to the open position (FIGS. 14B and 16B) when the actuation inlet port 160 receives the enable valve output EVO4. While FIG. 14B illustrates all of the signal valves in row R4 are moved to the open position when receiving the enable valve output EVO4 from the corresponding enable valve EV4 (FIG. 4), all of the signal valves in any of rows R1-R7 are movable from the closed position to the open position when receiving the enable valve output from any one or more of the enable valves.

Referring to FIG. 4, for every row of signal valves moved to the open position, each column includes the corresponding signal valve in the open position. All signal valves in each column receives a flow of air when the corresponding column receives the control valve output from the control valve. The opened signal valve generates a signal valve output when the entire column receives the control valve output from one of the control valves.

Referring to FIGS. 13, 15A, and 15B, the body 152 further forms a plurality of supply passages 162 fluidly connecting the cavities 154 in each column to one another. The body 152 further includes a plurality of supply inlet ports 164, with each supply inlet port 164 fluidly connecting the columns C1-C8 of cavities 154 to corresponding control valves CV1-CV8, such that the entire column of cavities 154 receives a flow of air when the corresponding supply inlet port 164 receives the control valve output from the corresponding control valve. The body 152 further includes a plurality of outlet ports 166 to flow the signal valve output when the actuation inlet port 160 receives an enable valve output from an enable valve and the supply inlet port 164 receives a control valve output from a third control valve. The outlet ports 166 are fluidly connected directly with corresponding air cells AC1-AC36 to inflate the same when generating the signal valve output. Continuing with the previous example illustrated in FIG. 4, the supply inlet port 164 that corresponds with column C1 (FIGS. 15A and 15B) fluidly connects the column C1 of cavities 154 to the control valve CV1 (FIGS. 4 and 6). The entire column C1 of cavities 154 receives a flow of air to generate a signal valve output SVO2 from opened signal valve SV2 (FIGS. 15B and 17B) in row R4 and inflate the corresponding air cell AC2 when the supply inlet port 164 of column C1 receives the control valve output CVO1 from the control valve CV1 electrically activated to generate the same.

While FIG. 15B illustrates all of the signal valves in column C1 receive a flow of air when receiving the control valve output CVO1 from the corresponding control valve CV1 (FIG. 4), it is contemplated that any one of columns C1-C8 of signal valves can receive a control valve output from any one or more of control valves CV1-CV8.

Furthermore, while FIG. 4 illustrates seven actuation inlet ports and corresponding rows of signal valves fluidly connected to a corresponding one of seven enable valves, it is contemplated that each actuation inlet port and corresponding row of signal valves may be fluidly connected to two or more enable valves. Similarly, while FIG. 4 illustrates eight supply inlet ports and corresponding columns of signal valves fluidly connected to one of eight control valves, it is contemplated that each supply inlet port and corresponding column of signal valves may be fluidly connected to two or more control valves. Still in other embodiments, the valve system can include passive valves in a matrix configured inverse to the matrix of FIG. 4, such that each enable valve is fluidly connected to one or more columns of signal valves and each control valve is fluidly connected to one or more rows of signal valves.

Figure 16A:
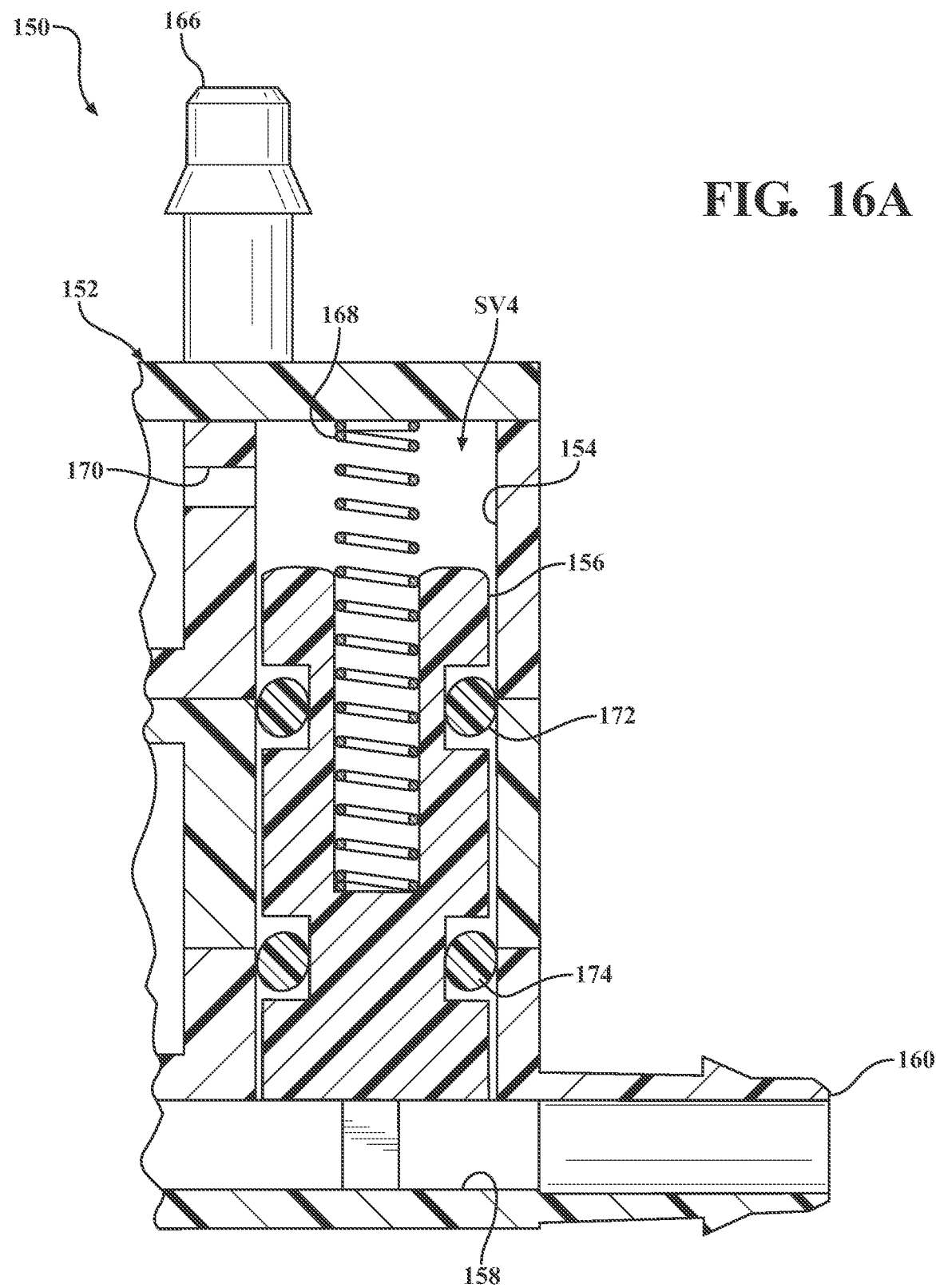
FIG. 16A is an enlarged cross-sectional view of the signal valve assembly of FIG. 6, as taken along line 16-16, illustrating one signal valve in the closed position.
Figure 16B:
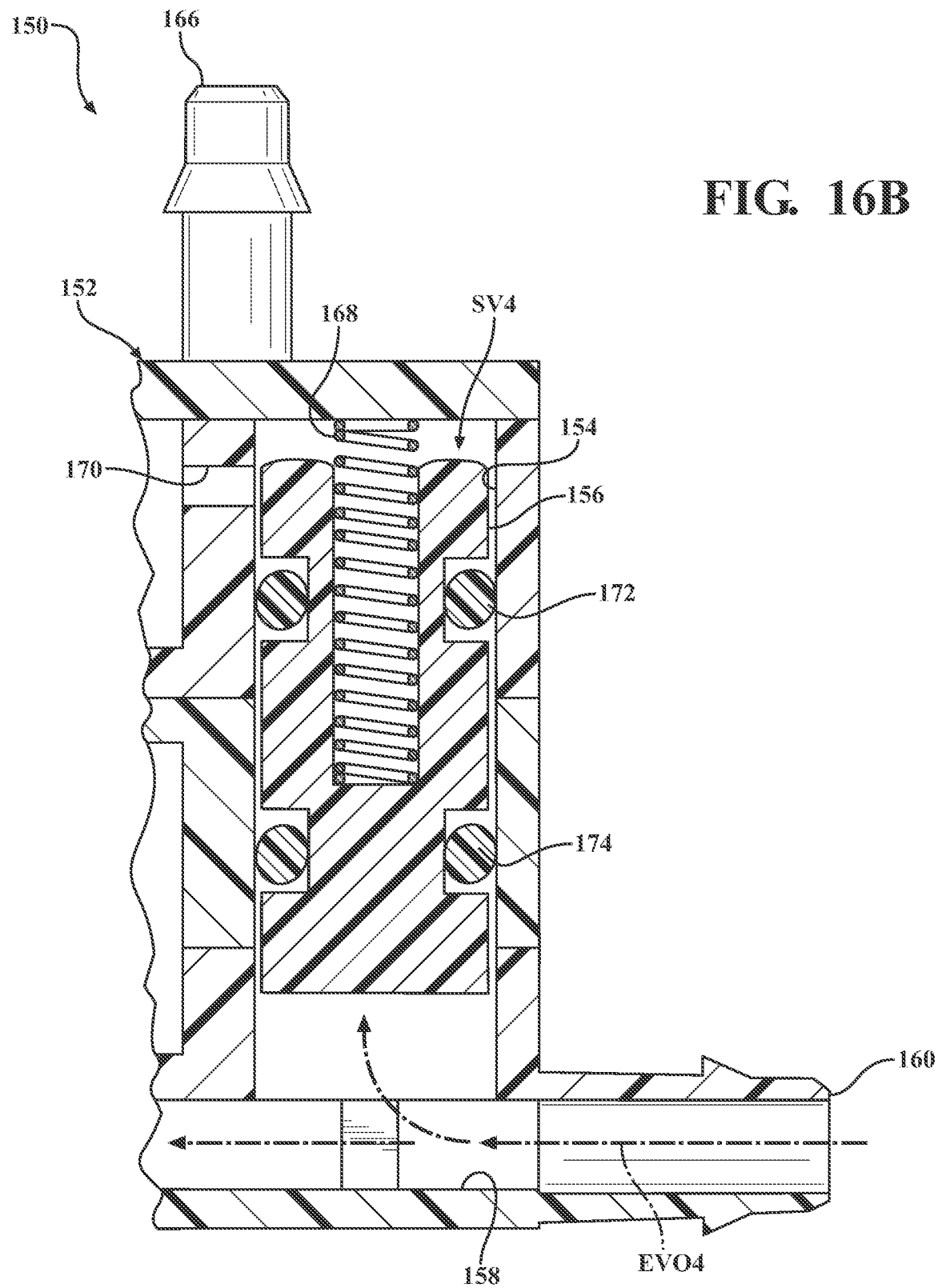
FIG. 16B is an enlarged cross-sectional view of the signal valve assembly of FIG. 6, as taken along line 16-16, illustrating one signal valve in the open position.

Referring to FIGS. 16A and 16B, each signal valve 124 is a normally closed valve including a spring 168 configured to move the piston 156 to the closed position (FIG. 16A) to block the corresponding flow path between the supply inlet port 164 and the outlet port 166. The body 152 further includes a plurality of exhaust ports 170 fluidly connected to the outlet ports 166 to deflate the corresponding air cell when the piston 156 is in the closed position.

Figure 17A:
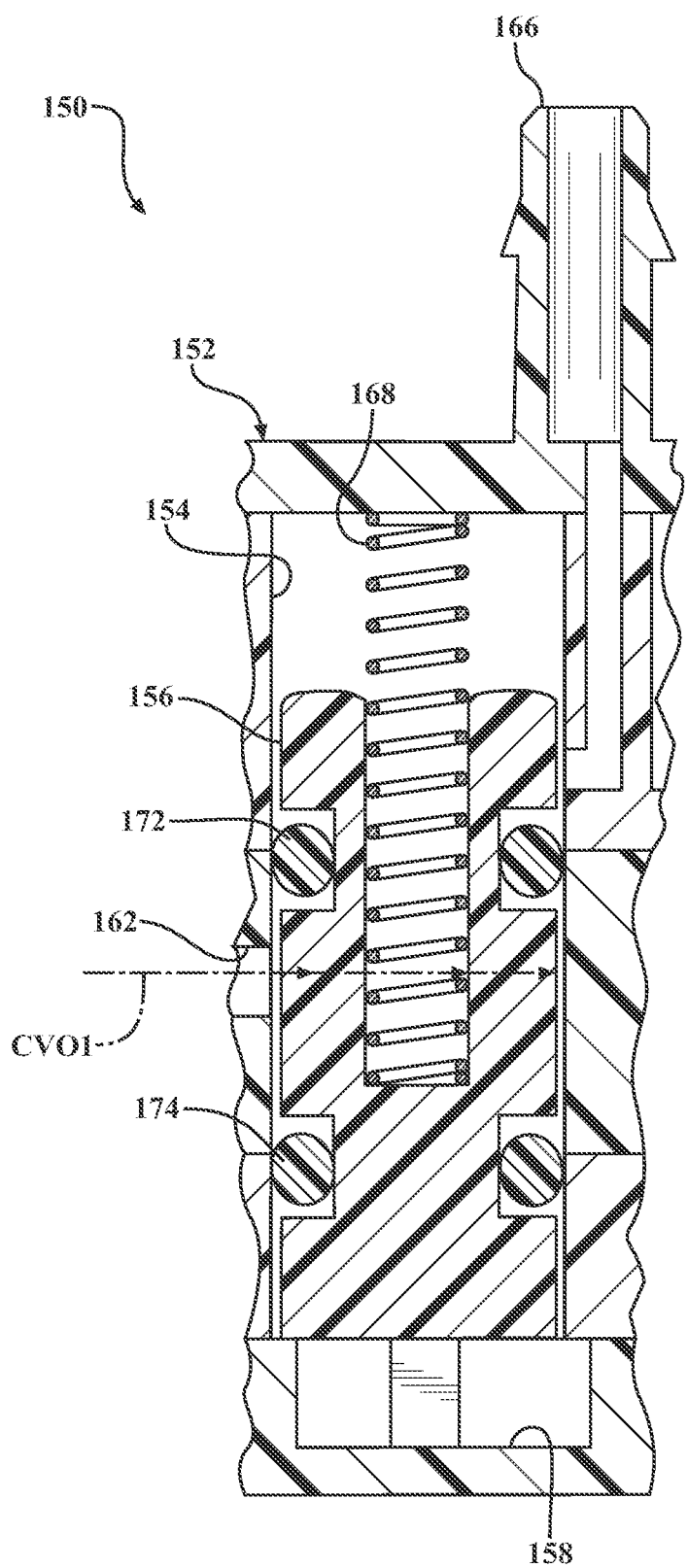
FIG. 17A is an enlarged cross-sectional view of the signal valve assembly of FIG. 6, as taken along line 17-17, illustrating one signal valve in the closed position.
Figure 17B:
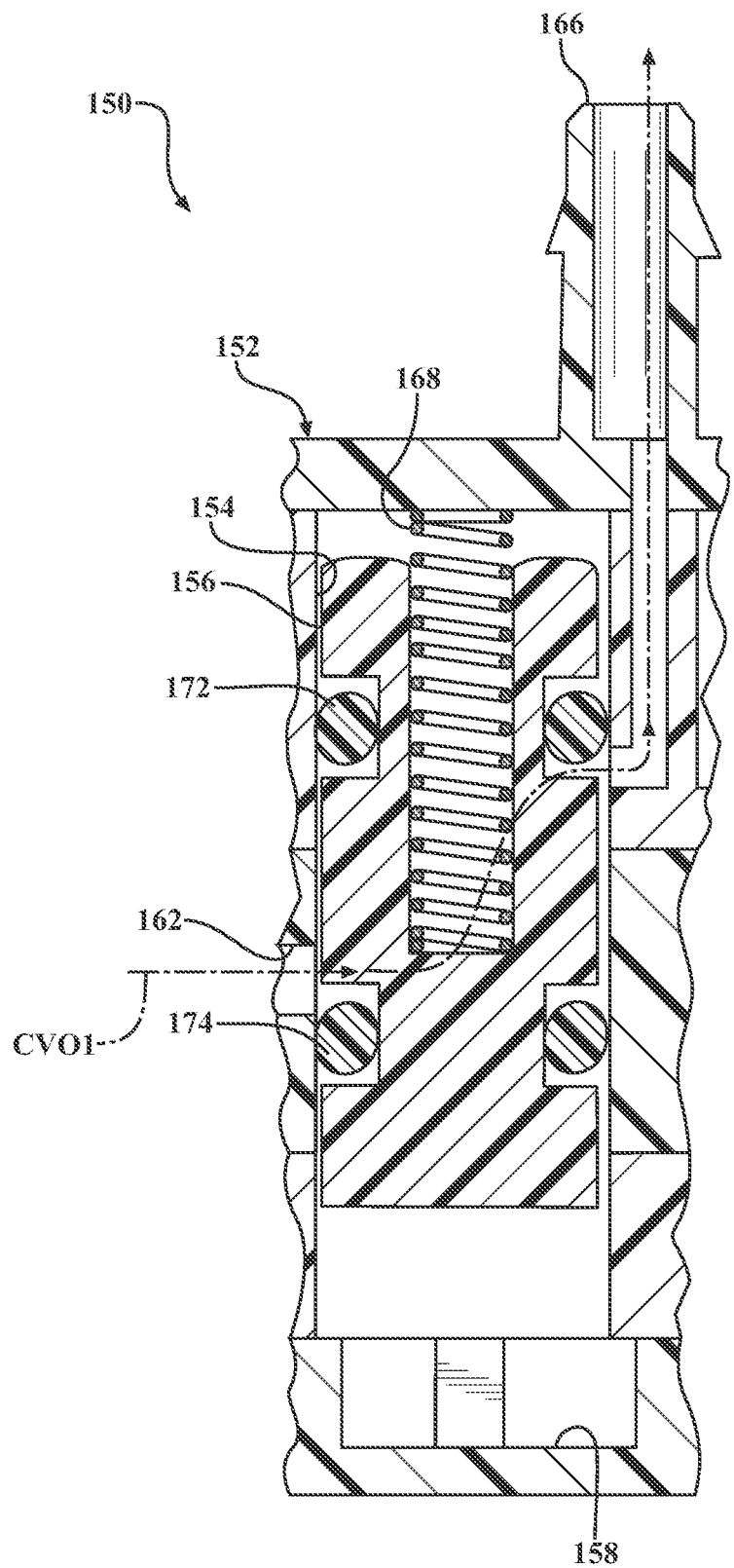
FIG. 17B is an enlarged cross-sectional view of the signal valve assembly of FIG. 6, as taken along line 17-17, illustrating one signal valve in the open position.
Figure 18:
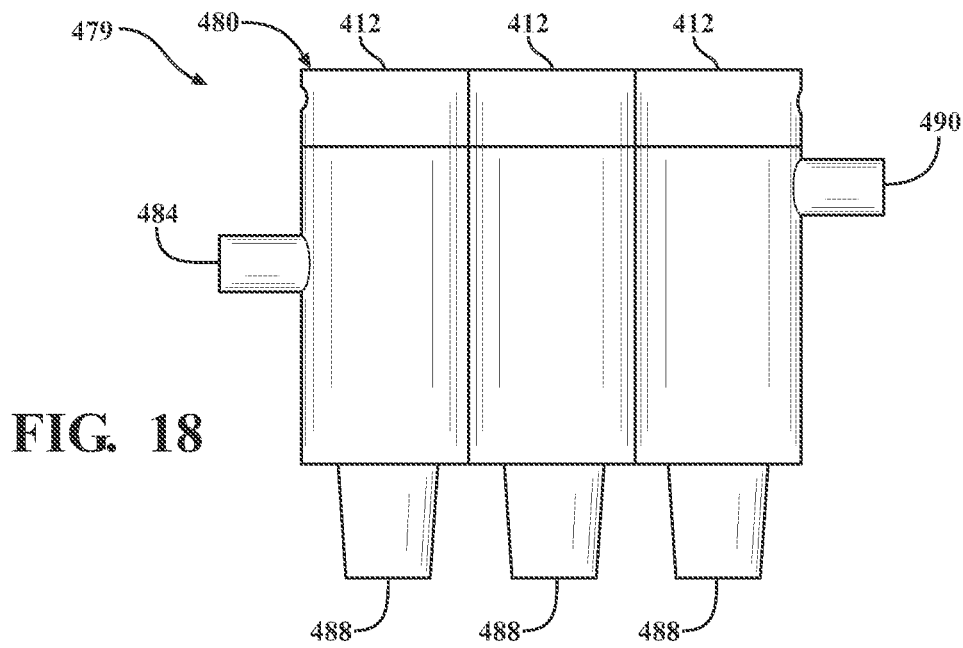
FIG. 18 is a front view of another embodiment of passive valves for the valve system of FIG. 1.
Figure 19:
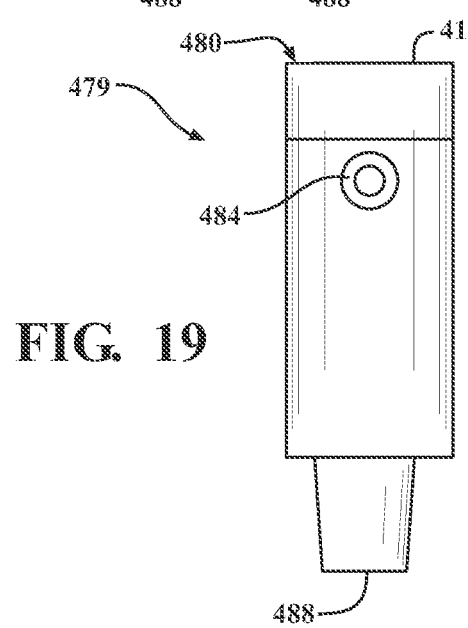
FIG. 19 is an end view of the passive valves of FIG. 18.
Figure 20:
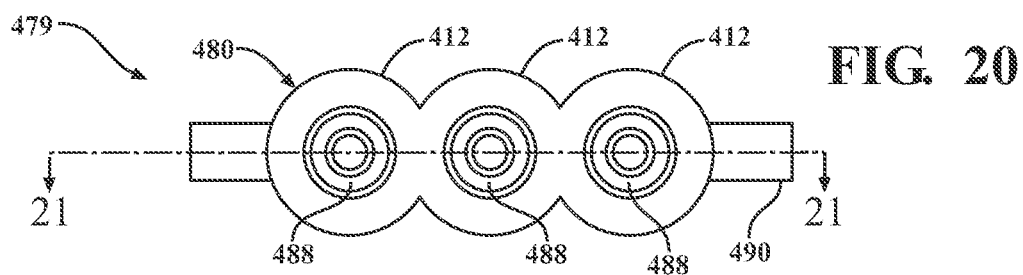
FIG. 20 is a top view of the passive valves of FIG. 18.

Referring to FIGS. 17A and 17B, each signal valve 124 also includes a first seal 172 carried by each piston 156 and configured to block fluid communication between the supply inlet port 164 and the corresponding outlet port 166 when the piston 156 is moved to the closed position. Each signal valve 124 further includes a second seal 174 carried by each piston 156 and configured to block fluid communication between the actuation inlet port 160 and all other ports for the corresponding signal valve 124, such that the piston moves from the closed position (FIG. 17A) to the open position (FIG. 17B) when the corresponding actuation inlet port 160 receives an enable valve output that is greater than the force of the spring 168 holding the piston 156 in the closed position. The supply inlet port 164 fluidly communicates with the outlet port 166 to generate the signal valve output and inflate the corresponding air cell when the piston 156 is in the open position.

The valve system can be configured to selectively inflate one or more of a total number of air cells based on the following equation:

$$\text{Total Number of Air Cells} = \frac{n!}{(n-r)! \times r!}$$

where n is the total number of control valves and r is the number of control valves that must be electrically activated to inflate one air cell.

The valve system 110 may include at least six control valves, at least five enable valves, and at least four signal valves, and the valve system electrically activates at least three of the control valves to inflate any one or more of a total of at least twenty air cells. As example, the valve system, which includes a total of eight control valves and electrically activates three of the control valves to inflate one air cell, can have a total of fifty-six air cells. However, the air channel routing for fluidly connecting each enable valve to any two control valves can occupy a significant amount of space. Air channel routing can be reduced when each enable valve is fluidly connected to a pair of control valves that are positioned adjacent to one another (FIG. 4), such that the valve system has a total of thirty-six air cells. In another embodiment, a valve system can include nine control valves and electrically activate three of the control valves to inflate one air cell, such that the valve system can selectively inflate forty-nine air cells. In yet another embodiment, a valve system can include seven control valves and electrically activate three of the control valves, such that the valve system can selectively inflate twenty-five air cells.

Referring to FIG. 4, the valve system 110 further includes a controller 176 configured to send the activation signal to at least three control valves CV1-CV8 to open the corresponding flow path and the pump 108 to generate a flow through the opened flow path and inflate the corresponding air cell. The controller 176 further includes a human machine interface 178 and is configured to be operated by a user to actuate the pump 108. The human machine interface 178 and the controller 176 can electrically activate the control valves CV1-CV8 to sequentially inflate and deflate the corresponding air cells to provide a rolling massage across an A surface of a vehicle seat. The controller and control valves may be configured to provide at least one pre-programmed sequence of air cell inflation and deflations to provide a specific feeling for the user. In some cases, the specific program could be operator controlled for personalized comfort. Within this system, it is intended that the control algorithms and programing are stored and executed within the electronics of the active valve control system, or with the vehicle directly.

In this embodiment, each control valve CV1-CV8 is fluidly connected directly with a stacked arrangement of 2-input valves (FIGS. 4 through 16B), including one enable valve and four signal valves. In other embodiments, each control valve may be fluidly connected directly with one or more 3-input passive valves 312 (FIGS. 17 through 20B). However, it is contemplated that the control valves may be fluidly connected to any suitable number of passive valves for selectively inflating air cells.

Referring to FIGS. 18 through 21B, another embodiment of passive valves 412 may be similar to the passive valves 112 of FIGS. 8 through 17B and include similar components for receiving at least three control valve outputs from corresponding control valves to inflate an air cell. While the passives valves 112 are separate 2-input valves spaced apart from one another, the passive valves 412 include 3-input valves 479.

Figure 21A:
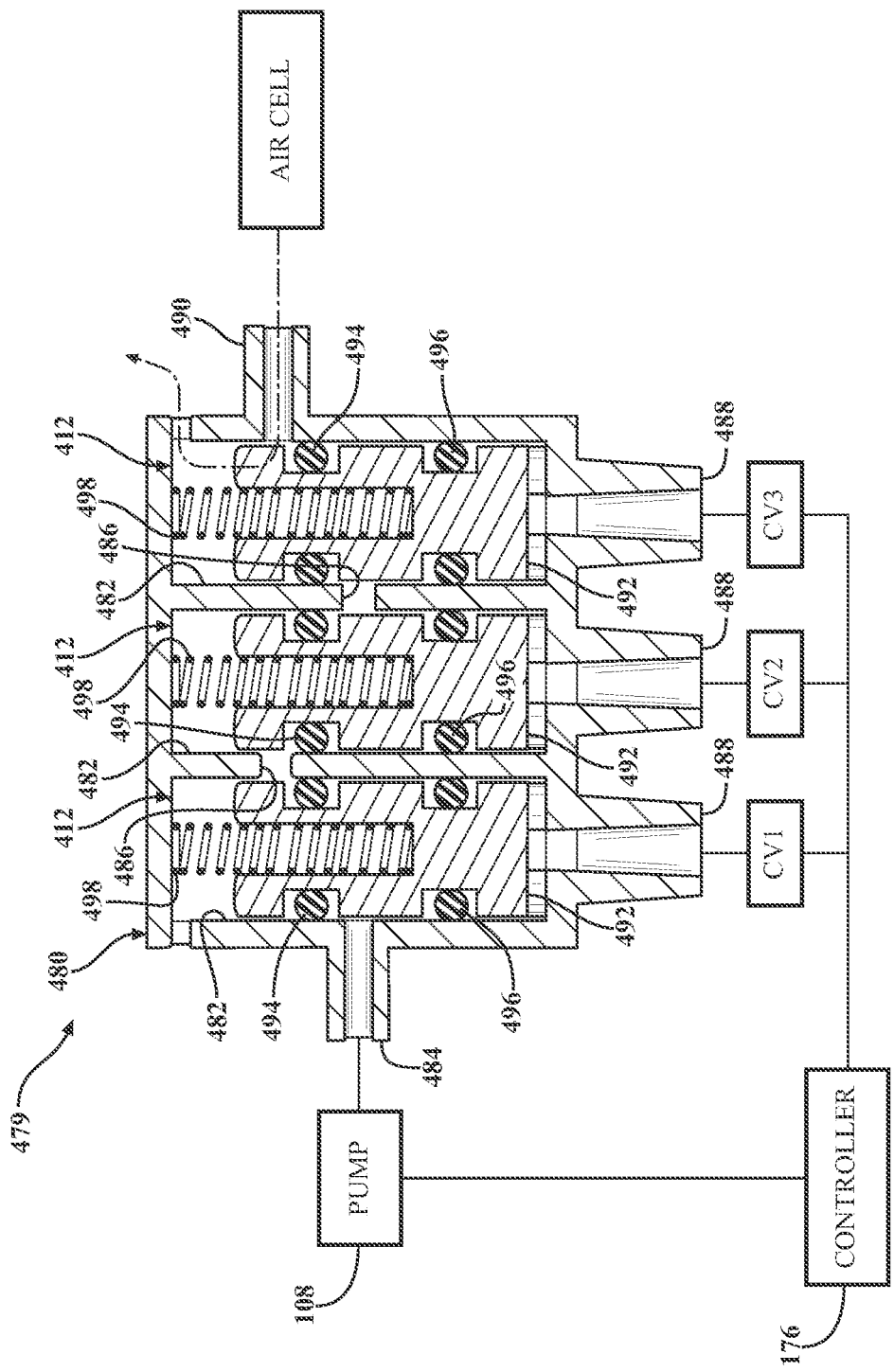
FIG. 21A is a cross-sectional view of the passive valves of FIG. 20, as taken along line 21-21, illustrating the passive valves in a closed position.
Figure 21B:
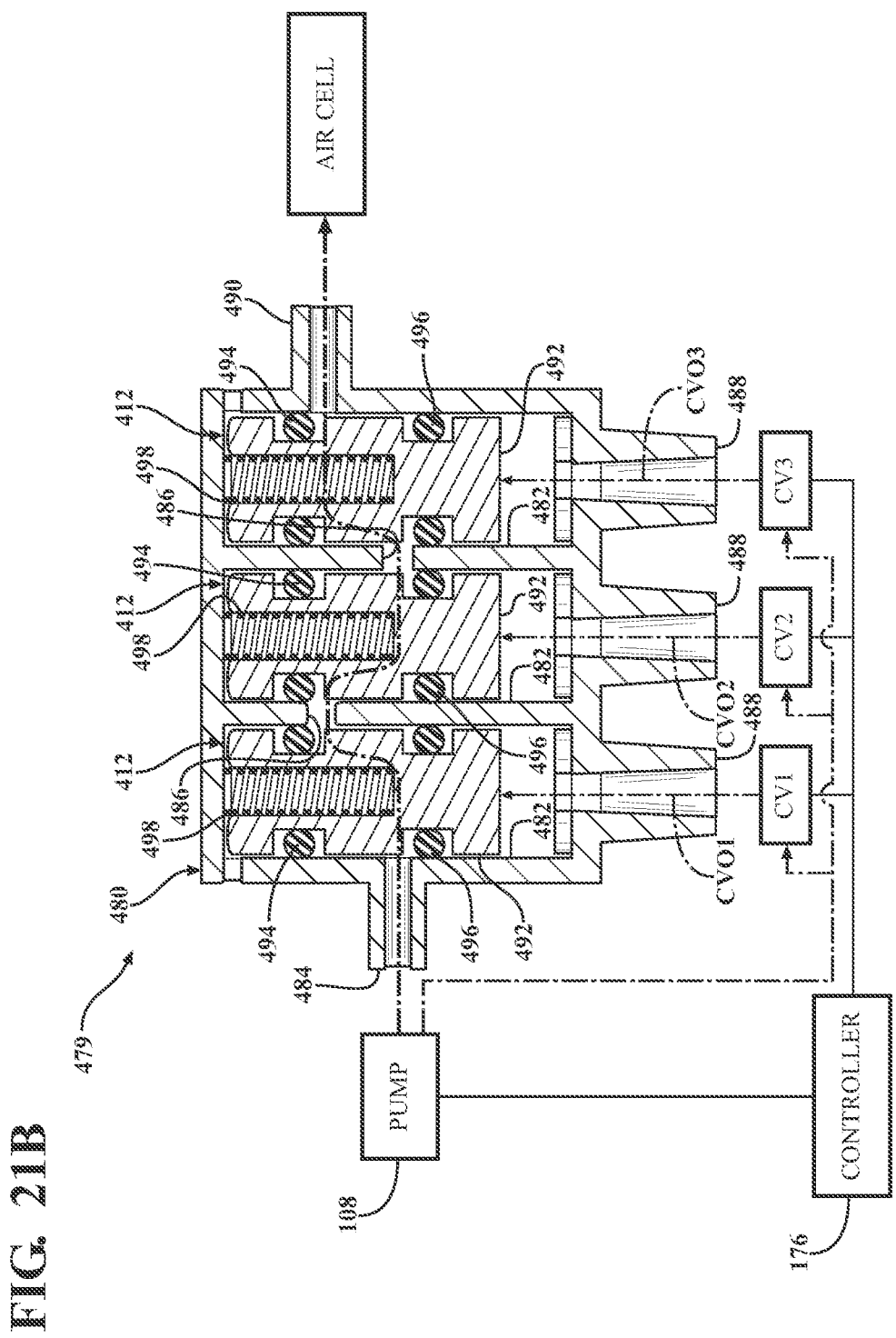
FIG. 21B is a cross-sectional view of the passive valves of FIG. 20, as taken along line 21-21, illustrating the passive valves in an open position.

As best shown in FIGS. 21A and 21B, the 3-input valve 479 includes a body 480 forming a plurality of cavities 482. The body 480 further forms a supply inlet port 484 fluidly connecting a first one of the cavities 482 to the pump 408. In addition, the body 480 also forms a plurality of supply passages 486 fluidly connecting the cavities 482 in series to one another. The body 480 further forms a plurality of actuation inlet ports 488 fluidly connecting corresponding cavities 482 to at least three control valves CV1, CV2, CV3. The body 480 further forms an outlet port 490 fluidly connected between a last one of the cavities 482 and the corresponding air cell. The 3-input valve 479 also includes a plurality of pistons 492 movable within a corresponding one of the cavities 482 to an open position to open a corresponding flow path to inflate the corresponding air cell when each of the actuation inlet ports 488 receives the control valve outputs CVO1, CVO2, CVO3 from the corresponding control valves CV1, CV2, CV3 and the supply inlet port 484 receives flow from the pump 408.

Each passive valve 412 also includes a first seal 494 carried by each piston 492 and configured to block fluid communication between the supply inlet port 484 and the outlet port 490 when any one or more of the pistons 492 is moved to the closed position. Each passive valve 412 further includes a second seal 496 carried by each piston 492 and configured to block fluid communication between the corresponding actuation inlet port 488 and all other ports 484, 486, 490, for the corresponding signal valve 124, such that the pistons 492 move from the closed position (FIG. 21A) to the open position (FIG. 21B) when the corresponding actuation inlet port 488 receives a control valve output that is greater than the force of a spring 498 holding the piston 492 in the closed position. The supply inlet port 484 fluidly communicates with the outlet port 490 to generate a valve output VO and inflate the corresponding air cell when receiving the flow of air from the pump 408 and all pistons 492 are in the open position.

Referring to FIGS. 22 through 26C, another embodiment of the passive valve 512 is a 2-input valve fluidly connected with another 2-input valve (not shown) in a stacked arrangement to open a flow path and inflate an air cell. The passive valve 512 includes a body 580 forming a plurality of cavities. The body 580 further forms a plurality of supply inlet ports fluidly connecting control valves CV1, CV2 to the corresponding cavities.

Figure 26B:
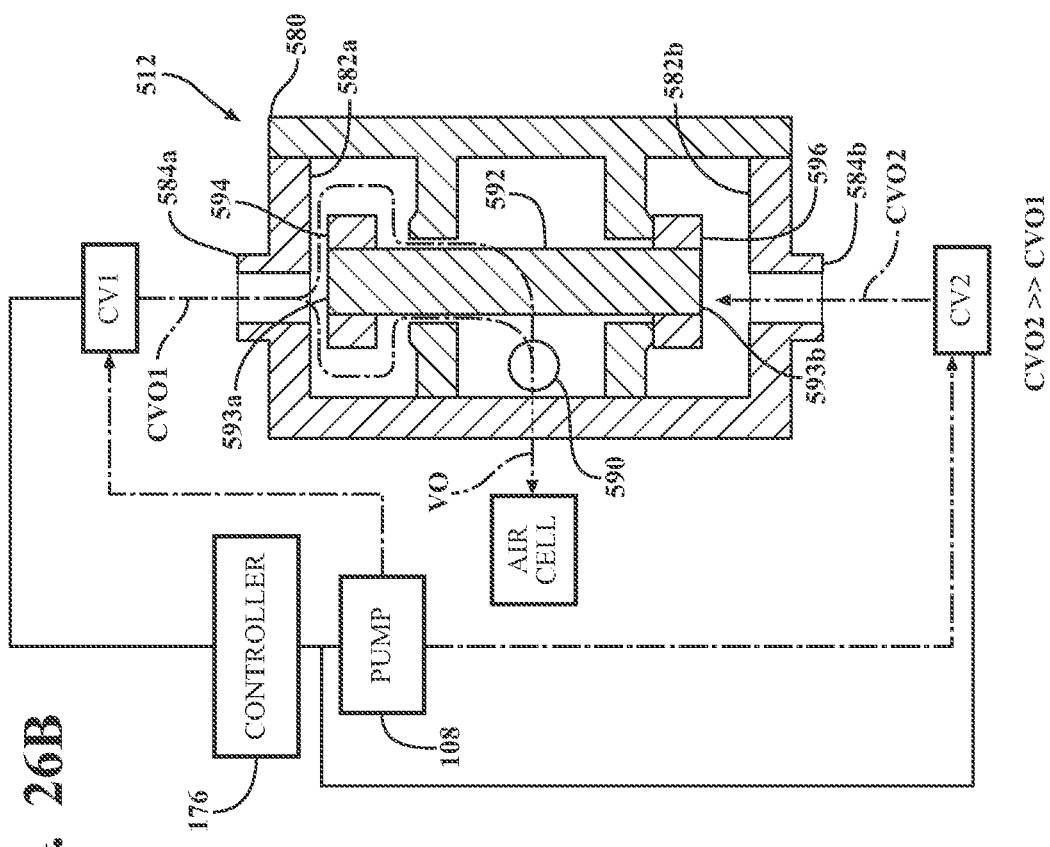
FIG. 26B is a cross-sectional view of the passive valves of FIG. 25, as taken along line 26-26, illustrating the passive valves in a first input position.
Figure 26A:
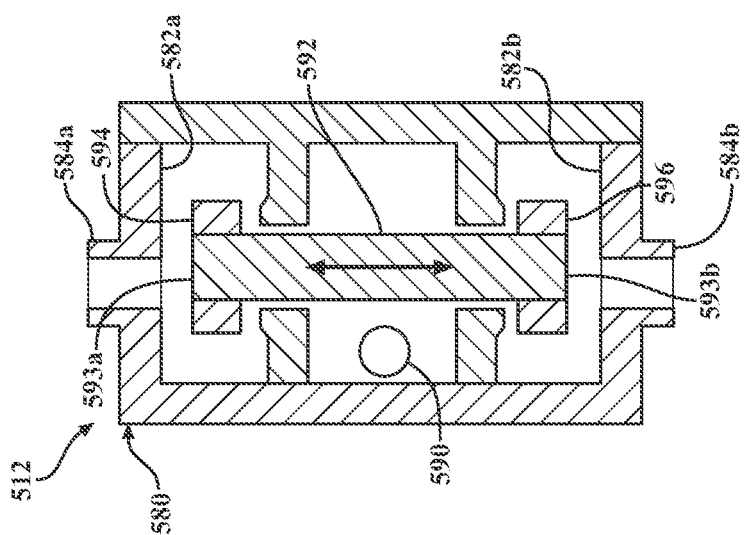
FIG. 26A is a cross-sectional view of the passive valves of FIG. 25, as taken along line 26-26, illustrating the passive valves in a rest position.
Figure 26C:
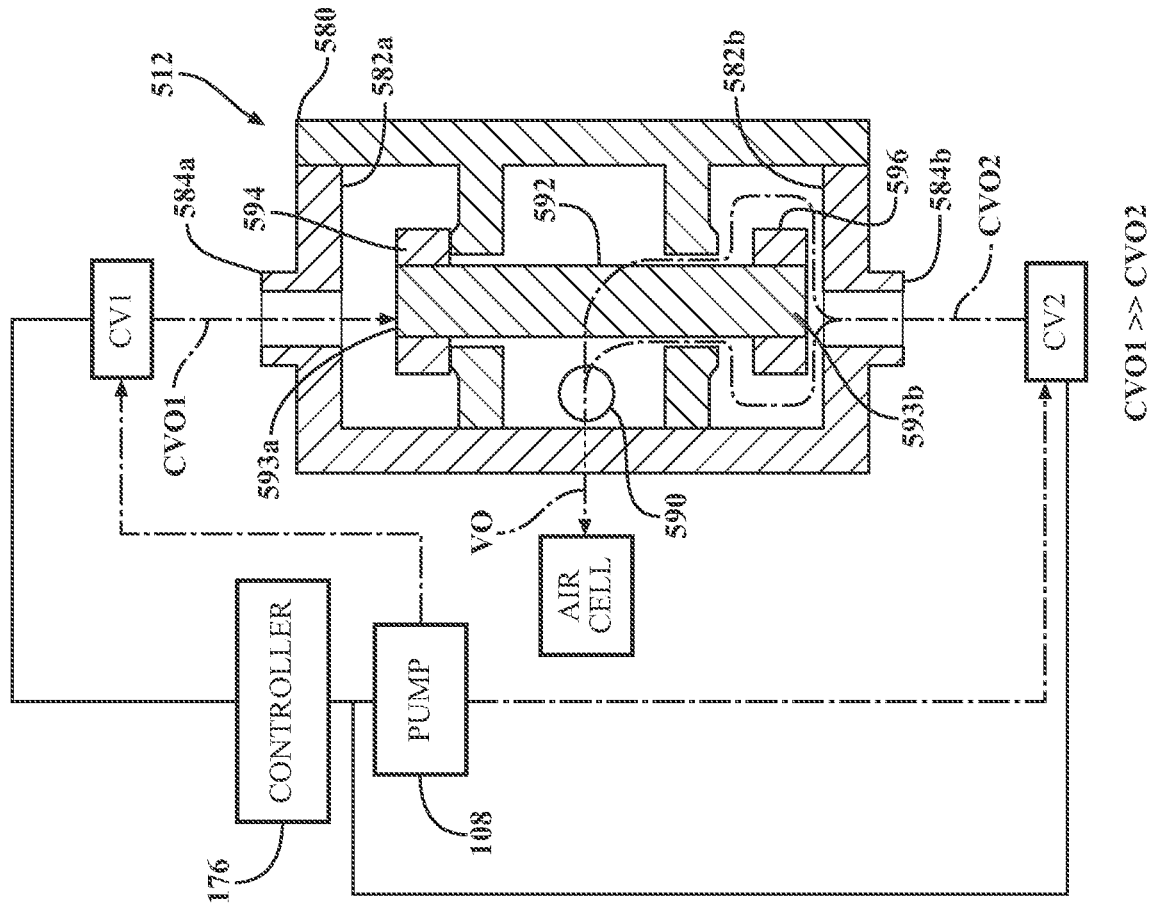
FIG. 26C is a cross-sectional view of the passive valves of FIG. 25, as taken along line 26-26, illustrating the passive valves in a second input position.

Referring to FIGS. 26A through 26C, the body 580 forms two cavities 582*a*, 582*b* and two supply inlet ports 584*a*, 584*b* fluidly connecting control valves CV1, CV2 with corresponding cavities 582*a*, 582*b*. In addition, the body 580 also forms a plurality of supply passages 586*a*, 586*b* fluidly connecting the each of cavities 582*a*, 582*b* with an outlet port 590, which is in turn fluidly connected to an air cell. The passive valve 512 also includes a shuttle body 592 movable within the cavities 582*a*, 582*b* to an open position to open a corresponding flow path when at least one of the supply inlet ports 584*a*, 584*b* receives the control valve outputs CVO1, CVO2 from the corresponding control valves CV1, CV2. Each passive valve 512 includes a first seal 594 carried by one end 593*a* of the shuttle body 592 and a second seal 596 carried by the other end 593*b* of the shuttle body 592.

Referring to FIG. 26B, the shuttle body 592 is movable to a first position when supply inlet port 582*b* receives the control valve output CVO2 that is greater than the control valve output CVO1 received by the supply inlet port 582*a*. When the shuttle body 592 is in the first position, the first seal 594 is spaced apart from the supply passage 586*a* to open the supply passage 586*a* and fluidly connect the supply inlet port 584*a* and the outlet port 590 with one another. In addition, the second seal 596 abuts against the portion of the body 580 forming the supply passage 586*b* to block fluid communication between the supply inlet port 584*b* and the outlet port 590.

Referring to FIG. 26C, the shuttle body 592 is movable to a second position when supply inlet port 582*a* receives the control valve output CVO1 that is greater than the control valve output CVO2 received by the supply inlet port 582*b*. When the shuttle body 592 is in the second position, the second seal 596 is spaced apart from the supply passage 586*b* to open the supply passage 586*b* and fluidly connect the supply inlet port 584*b* and the outlet port 590 with one another. In addition, the first seal 594 abuts against the portion of the body 580 forming the supply passage 586*a* to block fluid communication between the supply inlet port 584*a* and the outlet port 590.

A method of operating the vehicle seat assembly 100 of FIGS. 1 and 2 includes the step of transmitting an activation signal from the controller 176 to the pump 108 to generate a flow. The method further includes the step of moving at least three of the control valves CV1-CV8 to an open position when receiving the activation signal to open a flow path and generate control valve outputs corresponding with each of the three opened control valves. In addition, the method also includes the step of moving one of the enable valves EV1-EV7 to an open position to open the corresponding flow path when receiving the control valve outputs from two of the three control valves CV1-CV8 to open a flow path and generate an enable valve output corresponding with the opened enable valve. The method further includes the step of moving one of the signal valves SV1-SV36 to an open position to open the corresponding flow path when receiving the enable valve output from the opened enable valve and the control valve output from the other of the three opened control valves. The method further includes the step of inflating the air cell corresponding with the opened flow path.

It is contemplated that the valve system can have any number of control valves moved by the controller to selectively flow air to any number of enable valves and signal valves to in turn selectively inflate and/or deflate any combination of air cells mounted to a vehicle seat assembly. In particular, while the valve system as described above simultaneously moves three control valves to inflate one air cell mounted in the seat back of the vehicle seat assembly, it is contemplated that other embodiments of the valve system can be used to simultaneously move more than three control valves to inflate more than one air cell. The valve system can be configured to inflate and/or deflate air cells in any sequence, and the valve system can be configured to hold any combination of air cells in inflated or deflated states. Also, the air cells can be mounted to any suitable portion of the vehicle seat assembly to, for example, provide various configurations of air cells for supporting various passengers.

The present invention has been described herein in an illustrative manner, and it is to be understood that the terminology which has been used is intended to be in the nature of words of description rather than of limitation. Many modifications and variations of the present invention are possible in light of the above teachings. The invention may be practiced otherwise than as specifically described within the scope of the appended claims.

What is claimed is:

1. A vehicle seat assembly comprising:
a seat back;
a seat bottom coupled to said seat back; and
a bladder support system coupled to at least one of said seat back and said seat bottom, said bladder support system having:
a plurality of air cells mounted to at least one of said seat back and said seat bottom;
a pump fluidly connected to said plurality of air cells to selectively inflate said plurality of air cells when said pump receives an activation signal; and
a valve system defining a plurality of flow paths fluidly connected between said pump and said plurality of air cells, with said valve system further comprising:
at least three control valves, with each of said at least three control valves electrically controlled and movable to an open position to open a corresponding flow path and generate a control valve output when said control valve receives said activation signal;
a plurality of passive valves fluidly connected between each control valve and a corresponding air cell of the plurality of air cells and movable to an open position to open said corresponding flow path and generate a signal valve output to inflate the corresponding air cell, said plurality of passive valves configured to receive at least three of said control valve outputs from said at least three control valves; and
a controller configured to send said activation signal to said at least three control valves to open said corresponding flow path and said pump to generate a flow through said corresponding flow path to inflate said air cell.

2. The vehicle seat assembly of claim 1 wherein said plurality of passive valves comprises:
a plurality of enable valves, with each of said enable valves movable to said open position when receiving said control valve outputs from two of said control valves to open said corresponding flow path and generate an enable valve output;
a plurality of signal valves, with each of said plurality of signal valves movable to an open position when receiving said control valve output from the other of said control valves and said enable valve output from said enable valve to open said corresponding flow path and inflate said corresponding air cell.

3. The vehicle seat assembly of claim 1 wherein said plurality of passive valves comprises a plurality of 3-input valves, with each of said 3-input valves comprising:
a body;
a plurality of cavities;
a supply inlet port fluidly connecting one of said cavities to said pump;
a plurality of supply passages fluidly connecting said plurality of cavities in series to one another;
a plurality of actuation inlet ports fluidly connecting said plurality of cavities to said at least three control valves; and
an outlet port fluidly connected between one of said cavities and said corresponding air cell; and
a plurality of pistons movable within a corresponding one of said cavities to an open position to open a corresponding flow path to inflate said corresponding air cell when each of said actuation inlet ports receives said control valve output from said at least three control valves and said supply inlet port receives said flow from said pump.

4. The vehicle seat assembly of claim 1 wherein said seat back comprises a lower lumbar region and an upper lumbar region above said lower lumbar region, with said plurality of air cells being spaced apart from one another and mounted to at least one of said upper lumbar region and said lower lumbar region.

5. The vehicle seat assembly of claim 1 wherein said seat back comprises a pair of side bolsters with said lower lumbar positioned between said side bolsters and said plurality of air cells mounted to said pair of side bolsters.

6. The vehicle seat assembly of claim 1 wherein said seat back comprises a headrest connected to said upper lumbar region with said plurality of air cells mounted to said headrest.

7. The vehicle seat assembly of claim 1 wherein said controller comprises a human machine interface and is configured to actuate said pump and actuate said plurality of control valves to sequentially inflate said plurality of air cells when said human machine interface is operated by a user.

8. A bladder support system for vehicle seat assembly, the bladder support system comprising:
a plurality of air cells mounted to the vehicle seat assembly;
a pump fluidly connected to said plurality of air cells to selectively inflate said plurality of air cells when said pump receives an activation signal; and
a valve system defining a plurality of flow paths fluidly connected between said pump and said plurality of air cells, with said valve system further comprising:
at least three control valves, with each of said at least three control valves electrically controlled and movable to an open position to open a corresponding flow path and generate a control valve output when said control valve receives said activation signal;
a plurality of passive valves fluidly connected between each control valve and a corresponding air cell of the plurality of air cells and movable to an open position to open said corresponding flow path and generate a signal valve output to inflate the corresponding air cell, said plurality of valves configured to receive at least three control valve outputs from said at least three control valves; and
a controller configured to send said activation signal to said at least three control valves to open said corresponding flow path and said pump to generate a flow through said corresponding flow path to inflate said air cell.

9. The bladder support system of claim 8 wherein said plurality of passive valves comprises:
a plurality of enable valves, with each of said enable valves movable to said open position when receiving said control valve outputs from two of said control valves to open said corresponding flow path and generate an enable valve output;
a plurality of signal valves, with each of said plurality of signal valves movable to an open position when receiving said control valve output from the other of said control valves and said enable valve output from said enable valve to open said corresponding flow path and inflate said corresponding air cell.

10. The bladder support system of claim 9 wherein said plurality of enable valves comprises a body, and for each of said enable valves, said body comprises:
   a cavity;
   a piston movable within said cavity between a closed position and an open position;
   an actuation inlet port fluidly connected between said cavity and one of said control valves;
   a supply inlet port fluidly connected between said cavity and another of said control valves;
   an exhaust port fluidly connected between the atmosphere and said cavity when said piston is moved to said closed position; and
   an outlet port fluidly connected between said signal valves and said supply inlet port when said piston is moved to said open position.

11. The bladder support system of claim 10 wherein each of said enable valves further comprises a spring configured to move said piston to said closed position.

12. The bladder support system of claim 10 further comprising a first seal carried by said piston and configured to block fluid communication between said outlet port and said two inlet ports when said piston is moved to said closed position.

13. The bladder support system of claim 12 further comprising a second seal carried by said piston and configured to block fluid communication between said outlet port and the other of said two inlet ports.

14. The bladder support system of claim 9 wherein said plurality of signal valves comprises a body comprising:
   a plurality of cavities;
   a plurality of supply passages fluidly connecting said plurality of cavities to one another;
   a plurality of actuation passages fluidly connecting said plurality of cavities to one another;
   a plurality of supply inlet ports fluidly connecting said supply passages to one of said enable valve and said control valve;
   a plurality of actuation inlet ports fluidly connecting said actuation passages to the other of said enable valve and said control valve;
   a plurality of pistons movable within a corresponding one of said cavities to an open position when a corresponding one of said actuation inlet ports receives one of said control valve output from said control valve and said enable valve output from said enable valve;
   a plurality of outlet ports inflating said plurality of air cells when said piston is moved to said open position.

15. The bladder support system of claim 14 wherein each of said signal valves further comprises a spring configured to move said piston to a closed position.

16. The bladder support system of claim 14 wherein each of said signal valves comprises a first seal carried by each of said pistons and configured to block fluid communication between a corresponding outlet port of said plurality of outlet ports of said body of said signal valves and a corresponding supply inlet port of said plurality of pistons of said body of said signal valves when a piston of said plurality of pistons of said body of said signal valves is moved to said closed position.

17. The bladder support system of claim 16 wherein each of said signal valves comprises a second seal carried by each of said pistons and configured to block fluid communication between said outlet port and a corresponding actuation inlet port.

18. The bladder support system of claim 9 wherein each of said control valves is fluidly connected with at least one of said enable valves and at least four of said signal valves.

19. The bladder support system of claim 9 wherein each of said enable valves is fluidly connected with at least five of said signal valves and two of said control valves.

20. The bladder support system of claim 9 wherein each of said signal valves is fluidly connected with one of said air cells.

21. The bladder support system of claim 8 wherein said plurality of air cells comprises at least twenty air cells, and said plurality of control valves comprises at least six control valves.

22. The bladder support system of claim 8 wherein said plurality of passive valves comprises a plurality of 3-input valves, with each of said 3-input valves comprising:
   a body:
   a plurality of cavities;
   a supply inlet port fluidly connecting one of said cavities to said pump;
   a plurality of supply passages fluidly connecting said plurality of cavities in series to one another;
   a plurality of actuation inlet ports fluidly connecting said plurality of cavities to said at least three control valves; and
   an outlet port fluidly connected between one of said cavities and said corresponding air cell; and
   a plurality of pistons movable within a corresponding one of said cavities to an open position to open a corresponding flow path to inflate said corresponding air cell when each of said actuation inlet ports receives said control valve output from said at least three control valves and said supply inlet port receives said flow from said pump.

23. The bladder support system of claim 8 wherein said controller is configured to sequentially actuate said plurality of control valves to sequentially inflate said plurality of air cells.

24. The bladder support system of claim 8 wherein each of said passive valves is movable to a closed position to block said plurality of flow paths between said pump and said plurality of air cells and exhaust air from said corresponding air cell.

25. A method of operating a vehicle seat assembly comprising a seat back, a seat bottom coupled to the seat back, and a bladder support system coupled to at least one of the seat back and the seat bottom, the bladder support system having a plurality of air cells mounted to at least one of the seat back and the seat bottom, a pump fluidly connected to the plurality of air cells, and a valve system defining a plurality of flow paths fluidly connected between the pump and the plurality of air cells, with the valve system further comprising a plurality of control valves, a plurality of enable valves fluidly connected between each control valve and the corresponding air cells, a plurality of signal valves fluidly connected between each control valve and a corresponding air cell of the plurality of air cells, and a controller, the method comprising:
   transmitting an activation signal from the controller to the pump to generate a flow;
   moving at least three of the control valves to an open position, when receiving the activation signal, to open a flow path and generate a control valve output corresponding with each of the three opened control valves;

moving one of the enable valves to an open position to open the corresponding flow path when receiving the control valve output from two of the three control valves to open a flow path and generate an enable valve output corresponding with the opened enable valve;

moving one of the signal valves to an open position to open the corresponding flow path when receiving the enable valve output from the opened enable valve and the control valve output from the other of the three opened control valves; and inflating the air cell corresponding with the opened flow path.

\* \* \* \* \*